United States Patent
Nishiguchi

(10) Patent No.: US 9,032,174 B2
(45) Date of Patent: May 12, 2015

(54) INFORMATION PROCESSING APPARATUS FOR RESTRICTING ACCESS TO MEMORY AREA OF FIRST PROGRAM FROM SECOND PROGRAM

(71) Applicant: Fujitsu Limited, Kawasaki-shi (JP)

(72) Inventor: Naoki Nishiguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 86 days.

(21) Appl. No.: 13/763,918

(22) Filed: Feb. 11, 2013

(65) Prior Publication Data

US 2013/0246728 A1 Sep. 19, 2013

(30) Foreign Application Priority Data

Mar. 15, 2012 (JP) ................................. 2012-059458

(51) Int. Cl.
*G06F 13/00* (2006.01)
*G06F 12/14* (2006.01)

(52) U.S. Cl.
CPC .............. *G06F 12/14* (2013.01); *G06F 12/145* (2013.01)

(58) Field of Classification Search
CPC .............. G06F 3/0622; G06F 12/0292; G06F 12/0802; G06F 12/0842; G06F 12/1458; G06F 13/1642; G06F 13/1615
USPC ......... 711/163, 168; 710/20, 39, 264; 712/14, 712/225, 240; 713/159, 166, 323
See application file for complete search history.

(56) References Cited

U.S. PATENT DOCUMENTS

| | | | | |
|---|---|---|---|---|
| 6,151,684 A | * | 11/2000 | Alexander et al. | 714/4.21 |
| 6,457,107 B1 | * | 9/2002 | Wynn et al. | 711/152 |
| 7,017,025 B1 | * | 3/2006 | Kissell | 711/206 |
| 7,055,029 B2 | * | 5/2006 | Collins et al. | 713/161 |
| 7,162,576 B2 | * | 1/2007 | Mizuno et al. | 711/112 |
| 7,334,102 B1 | * | 2/2008 | Conway | 711/163 |
| 7,599,998 B2 | * | 10/2009 | Galbraith et al. | 709/213 |
| 7,966,466 B2 | * | 6/2011 | Kershaw et al. | 711/163 |
| 2005/0198422 A1 | * | 9/2005 | Galbraith et al. | 710/260 |
| 2006/0294519 A1 | * | 12/2006 | Hattori et al. | 718/1 |
| 2008/0222397 A1 | * | 9/2008 | Wilkerson et al. | 712/220 |
| 2009/0210070 A1 | * | 8/2009 | Schultz et al. | 700/7 |
| 2009/0327575 A1 | * | 12/2009 | Durham et al. | 711/6 |

FOREIGN PATENT DOCUMENTS

| | | |
|---|---|---|
| JP | 2005-227990 | 8/2005 |
| JP | 2006-155516 | 6/2006 |
| JP | 2007-4661 | 1/2007 |
| JP | 2008-257734 | 10/2008 |

* cited by examiner

*Primary Examiner* — Reba I Elmore
(74) *Attorney, Agent, or Firm* — Fujitsu Patent Center

(57) ABSTRACT

A processor determines whether a first program is under execution when a second program is executed, and changes a setting of a memory management unit based on access prohibition information so that a fault occurs when the second program makes an access to a memory when the first program is under execution. Then, the processor determines whether an access from the second program to a memory area used by the first program is permitted based on memory restriction information when the fault occurs while the first program and the second program are under execution, and changes the setting of the memory management unit so that the fault does not occur when the access to the memory area is permitted.

10 Claims, 39 Drawing Sheets

| BUSINESS AP IDENTIFICATION INFORMATION | EXECUTION INFORMATION |
|---|---|
| /system/app/gyoumu1.apk | — |
| /data/app/gyoumu2.apk | 0x80012000 |

301 — first row; 302 — second row

F I G. 3

| | | |
|---|---|---|
| PROHIBITED PHYSICAL ADDRESS | 0x40000000 ~ 0x5FFFFFFF | |
| PROHIBITED VIRTUAL ADDRESS | 0x70000000 ~ 0x700FFFFF | 0x81200000 ~ 0x812FFFFF |

FIG. 4

| DOMAIN NO. | CONVERSION DOMAIN NO. |
|---|---|
| 0 | 5 |
| 1 | 6 |
| 2 | 7 |

FIG. 5

| DOMAIN NO. | SETTING OF BUSINESS AP | SETTING OF AP OTHER THAN BUSINESS AP |
|---|---|---|
| 0 | FOLLOWING PAGE TABLE | ACCESS PROHIBITED |
| 1 | FOLLOWING PAGE TABLE | ACCESS PROHIBITED |
| 2 | FOLLOWING PAGE TABLE | ACCESS PROHIBITED |
| 5 | FOLLOWING PAGE TABLE | FOLLOWING PAGE TABLE |
| 6 | FOLLOWING PAGE TABLE | FOLLOWING PAGE TABLE |
| 7 | FOLLOWING PAGE TABLE | FOLLOWING PAGE TABLE |

FIG. 6

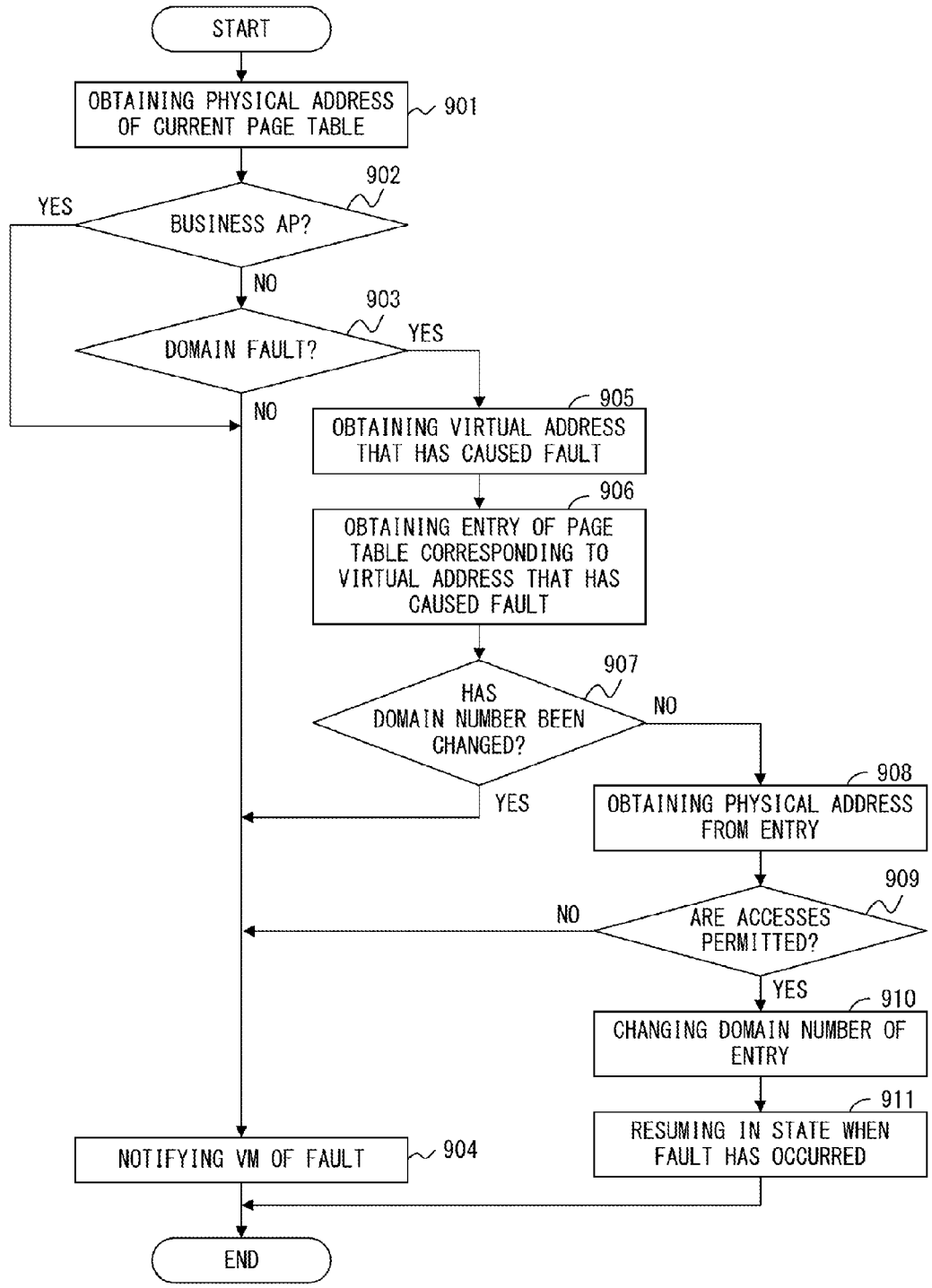
F I G. 9

| BUSINESS AP IDENTIFICATION INFORMATION | EXECUTION INFORMATION | PROHIBITED PHYSICAL ADDRESS | PROHIBITED VIRTUAL ADDRESS | PERMITTED VIRTUAL ADDRESS |
|---|---|---|---|---|
| 1101 /system/app/gyoumu1.apk | 0x800020000 | 0x40000000 ~ 0x5FFFFFFF | 0x70000000 ~ 0x700FFFFF | 0x60000000 ~ 0x6FFFFFFF |
| 1102 /data/app/gyoumu2.apk | 0x800028000 | — | 0x81200000 ~ 0x812FFFFF | 0x60000000 ~ 0x600FFFFF |

F I G. 1 1

| PAGE TABLE INFORMATION | REPLACEMENT PAGE TABLE INFORMATION |
|---|---|
| 0x80020000 | 0x81020000 |
| 0x80028000 | 0x81028000 |

1201 → first data row
1202 → second data row

F I G. 1 2

| VIRTUAL ADDRESS | PHYSICAL ADDRESS |
|---|---|
| 0x00000000 ~ 0x000FFFFF | 0x80200000 ~ 0x802FFFFF |
| 0x60000000 ~ 0x7FFFFFFF | 0x90000000 ~ 0xAFFFFFFF |

FIG. 15

| VIRTUAL ADDRESS | PHYSICAL ADDRESS |
| --- | --- |
| 0x00000000 ~ 0x001FFFFF | 0x80300000 ~ 0x804FFFFF |
| 0x60000000 ~ 0x812FFFFF | 0x90000000 ~ 0xB12FFFFF |

F I G. 1 6

| PROHIBITED PHYSICAL ADDRESS | 0x40000000 ~ 0x5FFFFFFF | 0x80200000 ~ 0x802FFFFF | 0xA0100000 ~ 0xAFFFFFFF |
|---|---|---|---|
| PROHIBITED VIRTUAL ADDRESS | 0x70000000 ~ 0x700FFFFF | | |

F I G. 1 7

| | | | | |
|---|---|---|---|---|
| PROHIBITED PHYSICAL ADDRESS | 0x40000000 ~ 0x5FFFFFFF | 0x80200000 ~ 0x802FFFFF | 0x80300000 ~ 0x804FFFFF | 0x90100000 ~ 0xB11FFFFF |
| PROHIBITED VIRTUAL ADDRESS | 0x70000000 ~ 0x700FFFFF | 0x81200000 ~ 0x812FFFFF | | |

FIG. 18

| PAGE TABLE INFORMATION | REPLACEMENT PAGE TABLE INFORMATION | SECOND LEVEL PAGE TABLE INFORMATION |
|---|---|---|
| 0x80020000 | 0x81020000 | 0x81050000 |
|  |  | 0x81051000 |
| 0x80028000 | 0x81028000 | 0x81057000 |

2201 indicates the first row; 2202 indicates the last row.

FIG. 22

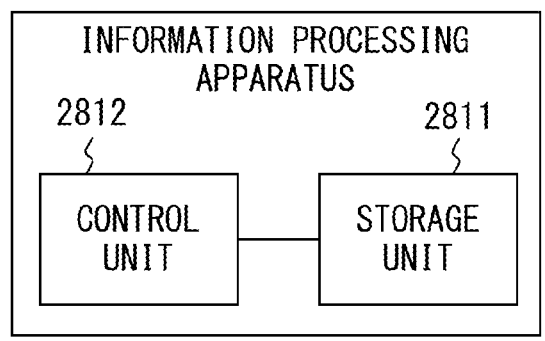
F I G. 2 8

| BUSINESS AP IDENTIFICATION INFORMATION | EXECUTION INFORMATION | PROHIBITED PHYSICAL ADDRESS | PERMITTED VIRTUAL ADDRESS |
|---|---|---|---|
| /system/app/gyoumu1.apk | — | | |
| /data/app/gyoumu2.apk | 0x80012000 | | |

F I G. 3 0

| PROHIBITED PHYSICAL ADDRESS | 0x40000000 ~ 0x5FFFFFFF | |
|---|---|---|

FIG. 31

| CONVERSION TABLE INFORMATION | REPLACEMENT CONVERSION TABLE INFORMATION |
|---|---|
| 0x80020000 | 0x80040000 |

3201

F I G. 3 2

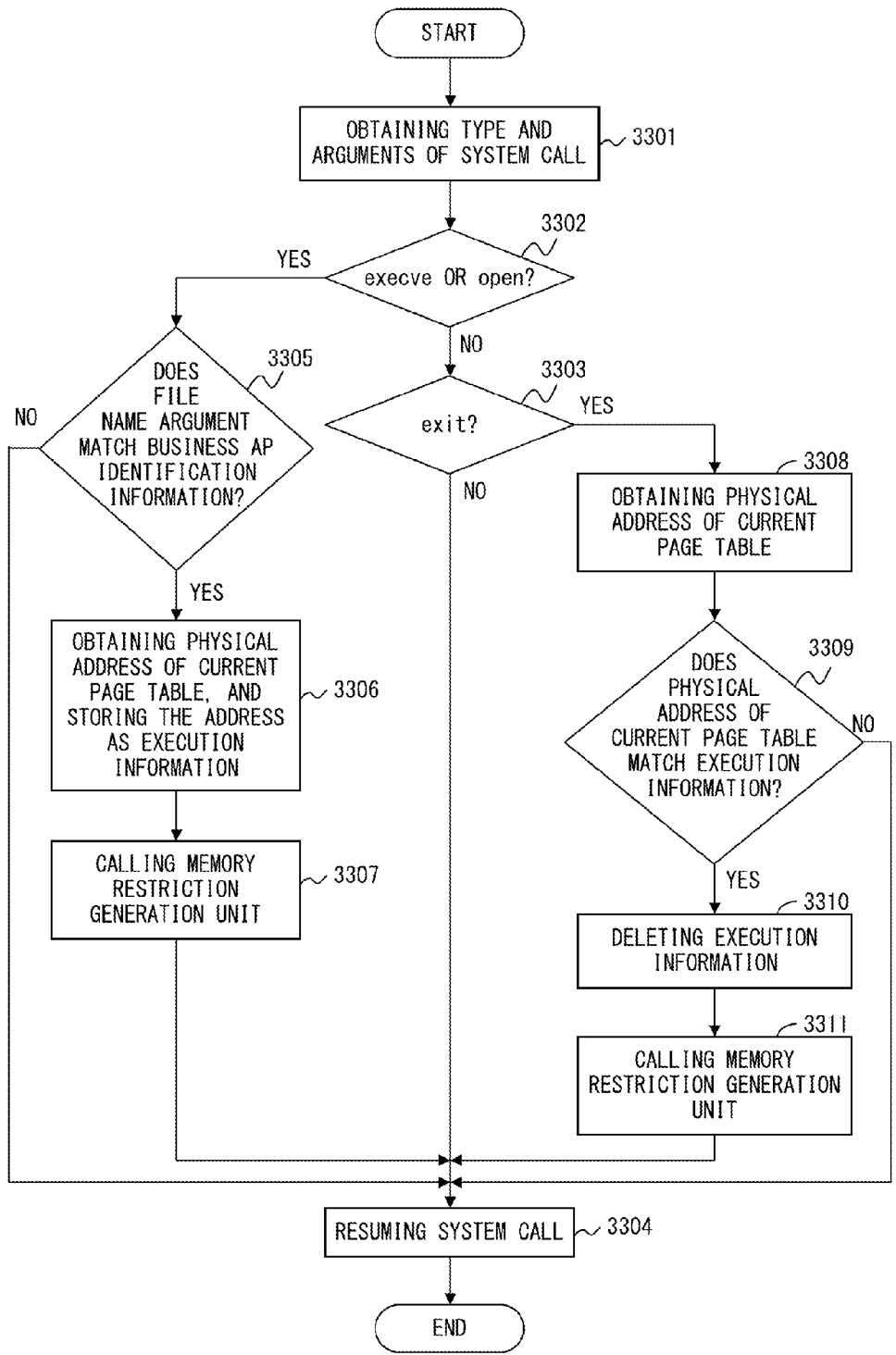
F I G. 33

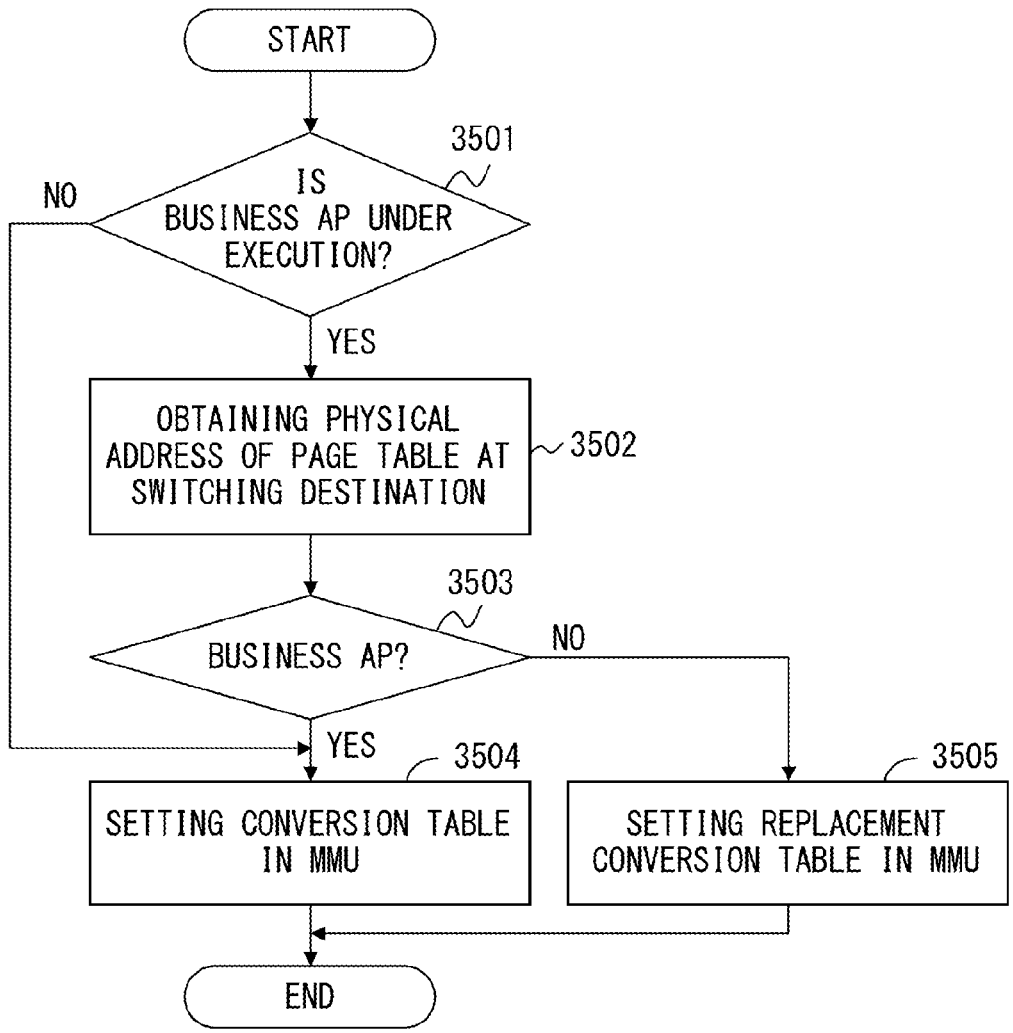
F I G. 3 5

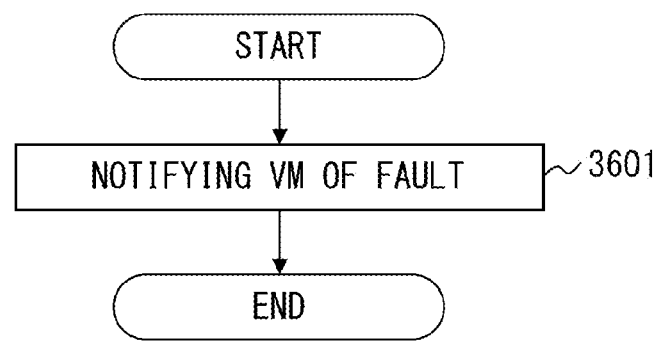
F I G. 3 6

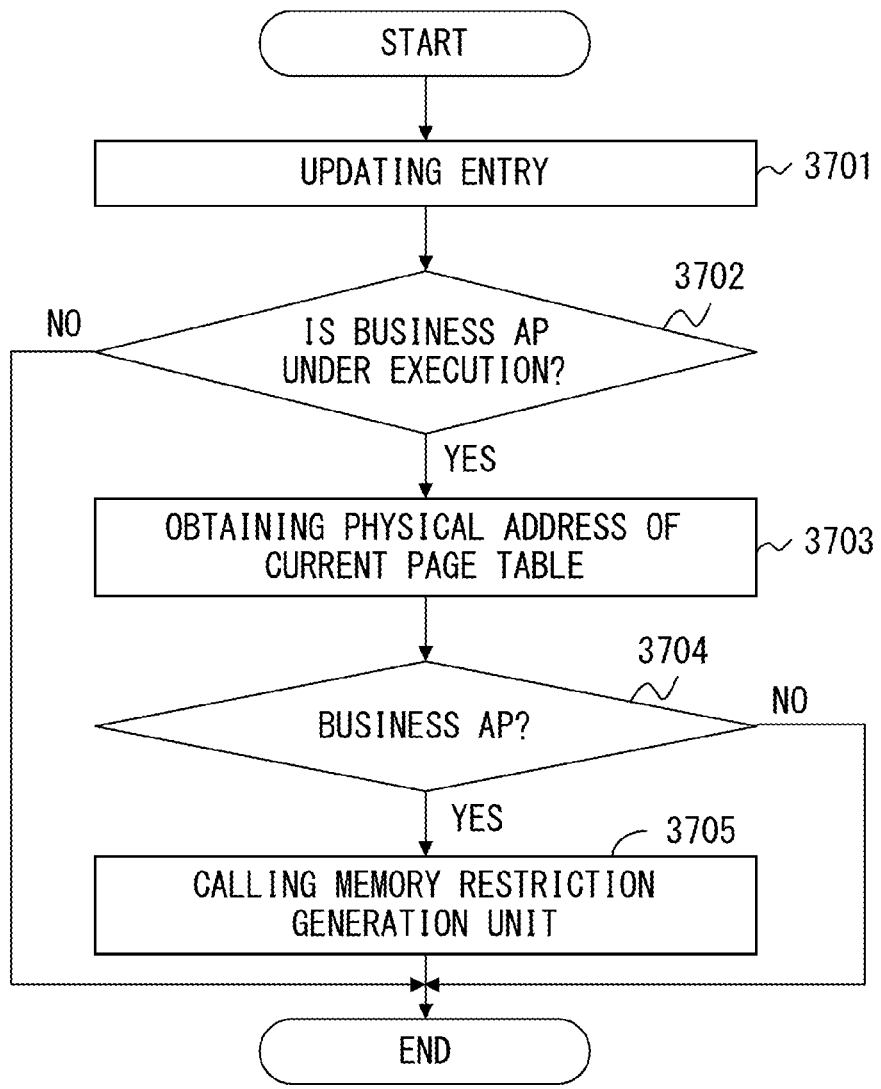
F I G. 3 7

INFORMATION PROCESSING APPARATUS FOR RESTRICTING ACCESS TO MEMORY AREA OF FIRST PROGRAM FROM SECOND PROGRAM

CROSS-REFERENCE TO RELATED APPLICATION

This application is based upon and claims the benefit of priority of the prior Japanese Patent Application No. 2012-059458, filed on Mar. 15, 2012, the entire contents of which are incorporated herein by reference.

FIELD

The embodiments discussed herein are related to an information processing apparatus and a recording medium.

BACKGROUND

In recent years, portable terminals such as a smartphone and the like have been popularized and carried as private information processing terminals. In the meantime, portable terminals have been utilized also as information processing terminals for business use, and some enterprises supply portable terminals as those for business purposes. Accordingly, employees often carry two terminals for private and business use, and desire to use his or her private terminal also for business use. However, to use one terminal for both private and business use, ensuring security of the terminal is important.

To make a private terminal available for business use while ensuring the security of the terminal, a method of integrating a private virtual machine (VM) and a business VM into one terminal by using a virtualization technique is known. With this method, operation environments of the private VM and the business VM are separated, and an operation environment of a business application program is constructed unchanged in the business VM, thereby ensuring security of business data. In the following description, an application program is simply referred to as an application or an AP in some cases.

Also a technique of memory protection between a guest operating system (OS) and an application in a VM that employs a microprocessor having two privilege levels is known. With this technique, a memory management unit switches between a memory protection table for the guest OS and that for the application, and references the switched table, so that an access from the application to a memory area of the guest OS can be restricted.

Also a technique of enabling protection information to be set with a fine grain also for data an address of which is not decided in advance in a memory management device is known. With this technique, information of access prohibition is set in an address translation table used to translate from a virtual address into a physical address, and a fault is caused to occur when an access is made to an area of the virtual address. Then, whether or not an access from an address currently being executed is permitted is determined when a fault occurs, so that the data is protected.

Patent Document 1: Japanese Laid-open Patent Publication No. 2007-004661
Patent Document 2: Japanese Laid-open Patent Publication No. 2006-155516

SUMMARY

According to an aspect of the embodiments, an information processing apparatus includes a memory and a processor. The memory stores memory restriction information for restricting an access to a memory area used by a first program from a second program, and access prohibition information for causing a fault to occur when the second program makes an access to a memory.

The processor determines whether the first program is under execution when the second program is executed. When the first program is under execution, the processor changes a setting of a memory management unit based on access prohibition information so that a fault occurs when the second program makes an access to the memory.

The processor determines whether an access from the second program to the memory area is permitted based on the memory restriction information when the fault occurs while the first program and the second program are under execution. The processor changes the setting of the memory management unit so that the fault does not occur when the access to the memory area is permitted.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates first business AP information.
FIG. 4 illustrates first memory restriction information.
FIG. 5 illustrates a domain number conversion table.
FIG. 6 illustrates domain settings.
FIG. 9 is a flowchart illustrating a process of a first fault processing unit.
FIG. 11 illustrates second business AP information.
FIG. 12 illustrates first table information.
FIG. 15 illustrates a page table of a first business AP.
FIG. 16 illustrates a page table of a second business AP.
FIG. 17 illustrates second memory restriction information.
FIG. 18 illustrates third memory restriction information.
FIG. 22 illustrates second table information.

FIG. 28 illustrates a functional configuration of a fifth information processing apparatus.

FIG. 30 illustrates third business AP information.

FIG. 31 illustrates fourth memory restriction information.

FIG. 32 illustrates third table information.

FIG. 33 is a flowchart illustrating a process of a fourth business AP identification unit.

FIG. 35 is a flowchart illustrating a process of a fourth context switching processing unit.

FIG. 36 is a flowchart illustrating a process of a third fault processing unit.

FIG. 37 is a flowchart illustrating a process of a third page table processing unit.

DESCRIPTION OF EMBODIMENTS

With a conventional method of integrating a private VM and a business VM into one terminal, operation environments of the private VM and the business VM are separated, and an operation environment of a business application program is constructed unchanged in the business VM, so that security of business data is ensured. However, an OS different from the private VM is installed in the business VM for executing the business application, posing a problem such that a lot of memory is consumed.

Such a problem occurs not only in a case where a private VM and a business VM are integrated into one terminal but in a case where an access to a memory area used by a first program from a second program is restricted in one information processing apparatus.

Embodiments are described in detail below with reference to the drawings.

An information processing apparatus according to an embodiment includes an information processing apparatus that can execute a first program and a second program like a portable terminal, a personal computer, a client, or a server.

Figure 1:
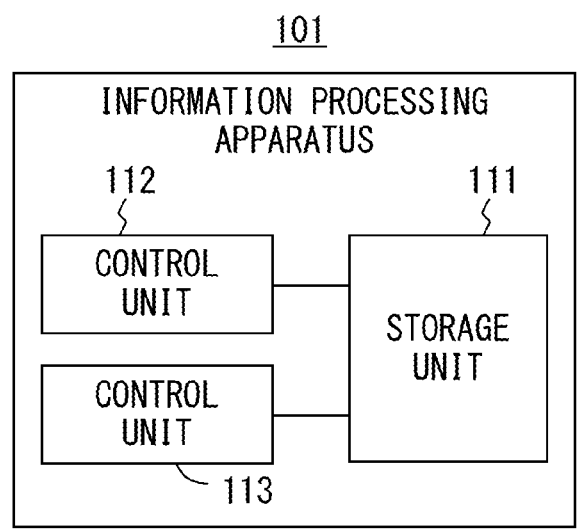
FIG. 1 illustrates a functional configuration of a first information processing apparatus.

FIG. 1 illustrates an example of a functional configuration of the information processing apparatus. The information processing apparatus 101 illustrated FIG. 1 includes a storage unit 111, a control unit 112, and a control unit 113.

The storage unit 111 stores memory restriction information for restricting an access to a memory area used by a first program from a second program, and access prohibition information for causing a fault to occur when the second program makes an access to a memory.

The control unit 112 determines whether or not the first program is under execution when the second program is executed. If the first program is under execution, the control unit 112 changes a setting of a memory management unit based on the access prohibition information so that a fault occurs when the second program makes an access to the memory.

The control unit 113 determines whether or not an access from the second program to the memory area is permitted based on the memory restriction information when a fault occurs while the first program and the second program are under execution. If the access to the memory area is permitted, the control unit 113 changes a setting of the memory management unit so that a fault does not occur.

With such an information processing apparatus, an access from the second program to the memory area used by the first program can be restricted while reducing memory consumption when the first program and the second program are executed.

Figure 2:
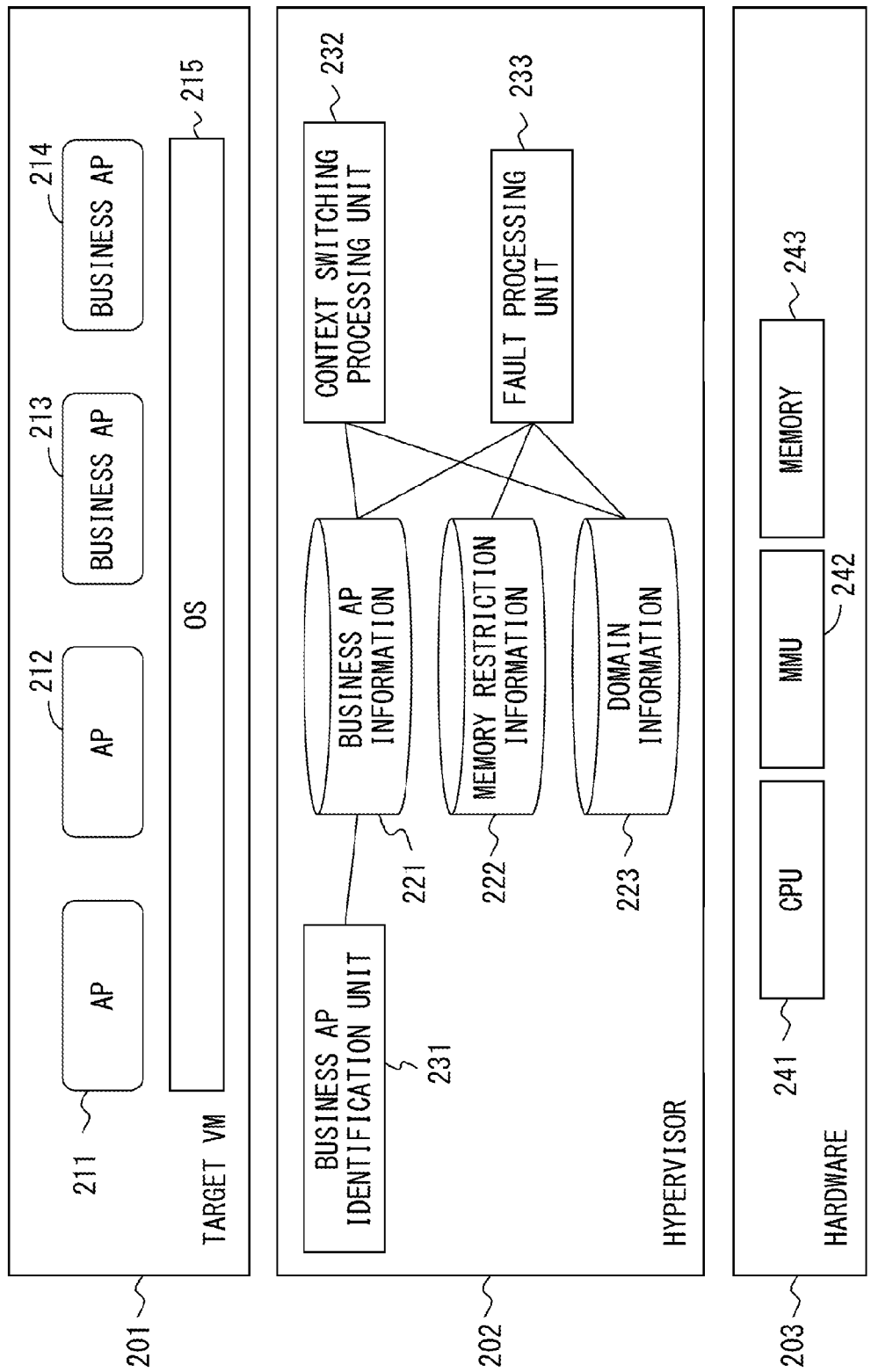
FIG. 2 illustrates a configuration of functions and hardware of a second information processing apparatus.

FIG. 2 illustrates a configuration example of functions and hardware of the information processing apparatus.

Hardware 203 of the information processing apparatus illustrated in FIG. 2 includes a Central Processing Unit (CPU) 241, an Memory Management Unit (MMU) 242, and a memory 243.

The CPU 241 (processor) implements functions of a target VM 201 and a hypervisor 202 by executing instructions. Within the VM 201, an OS 215 is running, and applications (APs) 211, 212, and business APs 213, 214 are executed on the OS 215. The APs 211, 212 are, for example, private applications other than the business APs. The OS 215 does not make a distinction between the APs 211, 212 and the business APs 213, 214 from an application viewpoint. The number of business APs executed on the OS 215 may be one or more, and also the number of applications other than the business APs may be one or more.

The MMU 242 includes a Translation Look-aside Buffer (TLB), and makes an access to the memory 243 based on a page table and domain settings, which are set by the hypervisor 202. At that time, the MMU 242 refers to the page table from the memory 243 or the TLB.

The memory 243 stores various types of programs and various types of data of the VM 201 and the hypervisor 202. The various types of data include business AP information 221, memory restriction information 222, and domain information 223. The CPU 241 makes an access to the memory 243 via the MMU 242.

The hypervisor 202 is a control program for the VM 201. The hypervisor 202 includes a business AP identification unit 231, a context switching processing unit 232, and a fault processing unit 233. The hypervisor 202 performs a memory control access by using the business AP information 221, the memory restriction information 222, and the domain information 223. If a plurality of target VMs are present, the memory access control can be performed by holding these types of information respectively for the VMs.

FIG. 3 illustrates an example of the business AP information 221. The business AP information of FIG. 3 includes business AP identification information, and execution information. The business AP identification information is information for identifying that a business AP is executed in the VM 201. The business AP identification information is, for example, a file name of an executable file of a business AP.

The execution information is information when a business AP is executed in the VM 201. The execution information is, for example, a physical address of a page table that implements a virtual address space for a business AP. The page table is used to convert a virtual address into a physical address of the memory 243. If a business AP is not under execution in the VM 201, the execution information is empty. The execution information in an entry 301 of FIG. 3 is empty, and the execution information in an entry 302 indicates that the physical address of the page table is 0x80012000. 0x denotes a hexadecimal number.

FIG. 4 illustrates an example of the memory restriction information 222. The memory restriction information illustrated in FIG. 4 represents areas for which an access is denied, and is preset for the business APs. A prohibited physical address represents a physical address area for which an access is denied, and used to check a physical address specified in a page table. A prohibited virtual address represents a virtual address area for which an access is denied, and used to check a virtual address that has caused a fault.

Figure 5:
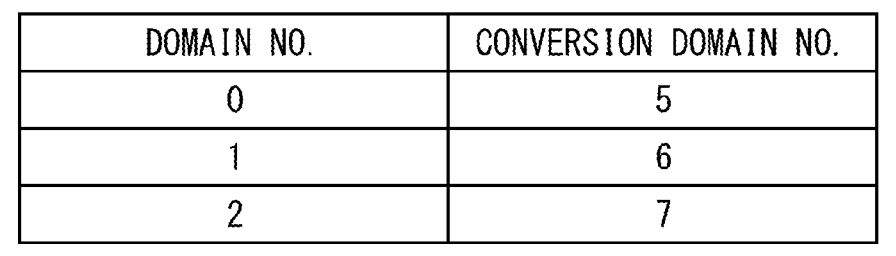

FIGS. 5 and 6 illustrate an example of the domain information 223. The domain information 223 includes a domain number conversion table illustrated in FIG. 5, and domain settings illustrated in FIG. 6.

By way of example, for an ARM (registered trademark) processor, there are 16 domain numbers 0 to 15, for each of which one of a setting following a page table, an access prohibition setting and an access permission setting can be made. If following a page table is set, there is no effect as a domain. If the access prohibition is set, an access is prohibited regardless of an access right of the page table. In the access permission is set, an access is permitted regardless of the access right of the page table. A domain number is set in an entry of the page table, and used to control an access to each domain.

How to use a domain number differs depending on an OS. Preparing the domain information 223 for each OS can cope with a case where a plurality of target VMs are present.

A domain fault is set to occur for domain numbers 0, 1, and 2 in order to check whether or not an access to a corresponding memory area is permitted when an AP other than the business AP makes an access to the memory 243. Then, a domain number of a domain for which the checking has been performed is changed to a conversion domain number according to the domain number conversion table.

In the domain number conversion table illustrated in FIG. 5, conversion domain numbers 5, 6, and 7 are respectively set for the domain numbers 0, 1, and 2. In this case, domain settings of the business AP, and the AP other than the business AP for the domain numbers 0, 1, 2, 5, 6, and 7 are those illustrated in FIG. 6.

The domain settings illustrated in FIG. 6 indicate that the OS 215 and the business APs on the VM 201 use the domains having the domain numbers 0, 1, and 2, and following a page table is set for each of the domain numbers. The settings of the AP other than the business AP indicate that an access to the domain numbers 0, 1, and 2 is prohibited. As a result, a domain fault occurs when the AP other than the business AP makes an access to the domain numbers 0, 1, and 2.

When a domain fault occurs, the hypervisor 202 determines whether or not to permit an access. If the access is permitted, a domain fault is prevented from occurring at subsequent accesses by changing a domain number in the page table to a corresponding conversion domain number. The reason why the domain settings of the business AP are made also for the domain numbers 5, 6, and 7 is that the domain settings of the business AP are used when the business AP is not executed. The domain number of an AP other than the business AP can be possibly changed to 5, 6, or 7, and following a page table is set to allow an access to these domains.

In FIG. 6, following a page table is set for the domain numbers 0, 1, and 2. However, a domain setting may be sometimes changed by an OS. In this case, also a domain setting for a corresponding conversion domain number is changed. For example, if the domain number 0 is changed to a setting for permitting an access, also the domain settings of the business AP and those of the AP other than the business AP for the corresponding conversion domain number 5 are changed to a setting for permitting an access.

Figure 7:
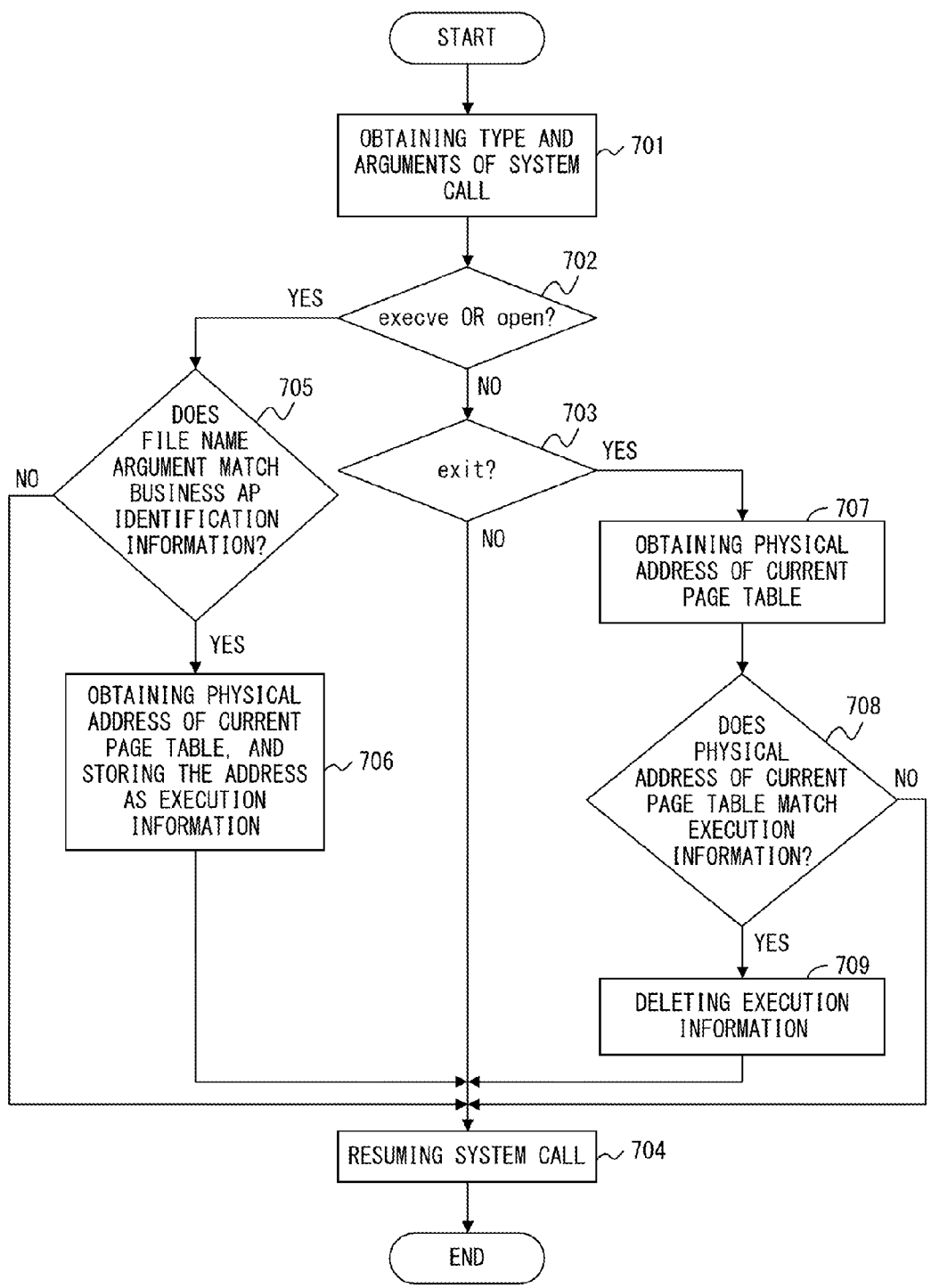
FIG. 7 is a flowchart illustrating a process of a first business AP identification unit.

FIG. 7 is a flowchart illustrating an example of a process executed by the business AP identification unit 231 of the hypervisor 202. The business AP identification unit 231 manages an execution status of a business AP in the VM 201 by using the business AP information 221.

The business AP identification unit 231 starts the process at timing when any of the APs 211 to 214 makes a system call to the OS 215 in the VM 201. With a function of the CPU 241, the process of the system call in the VM 201 can be transferred to the hypervisor 202.

The business AP identification unit 231 obtains a type and arguments of the system call from registers of the CPU 241 when the system call is made (step 701). For example, if the OS 215 is Linux (registered trademark) intended for an ARM processor, a system call number is set in a register r7, and the arguments are set in registers r0 to r6. The type and the arguments of the system call can be obtained from these registers. Call conventions of system calls differ depending on an OS 215 running on a VM 201. Therefore, a method of obtaining a type and arguments of a system call varies depending on the OS 215.

Next, the type of the system call is checked (steps 702, 703). If the type of the system call is "execve" or "open" ("YES" in step 702), a file name argument is compared with file names set in the business AP identification information of entries in the business AP information 221 (step 705).

If the file name argument matches a file name of the business AP identification information of an entry ("YES" in step 705), it is proved that the business AP is to be executed. Accordingly, a physical address of a page table (the current page table) currently set in the MMU 242 is set as execution information of the entry (step 706). Then, the process is transferred to the OS 215, which resumes the process of the system call (step 704). Alternatively, if the file name argument matches none of the file names of the entries ("NO" in step 705), a process in step 704 is executed.

If the type of the system call is neither "execve" nor "open" ("NO" in step 702), and if the type is "exit" ("YES" in step 703), the physical address of the current page table is obtained (step 707). Then, the physical address is compared with execution information of the entries in the business AP information 221 (step 708).

If the physical address matches execution information of an entry ("YES" in step 708), it is proved that the business AP is to be terminated. Accordingly, the execution information of that entry is deleted and set to be empty (step 709), and the process in step 704 is executed. Alternatively, if the physical address matches none of the execution information in the entries ("NO" in step 708), the process in step 704 is executed.

If the type of the system call is none of "execve", "open" and "exit" ("NO" in step 702 and "NO" in step 703), the process in step 704 is executed.

In FIG. 7, the system calls "execve" and "open" are taken as an example in order to identify the execution start of the business AP. The reason is as follows. With Linux, a new process is initially generated by a system call "fork" when an application is executed, and the application is loaded and executed by "execve" in the new process. Accordingly, the execution start of an application can be identified by checking "execve".

In the meantime, with an Android (registered trademark) application, a process named "Zygote" generates a new process with "fork", and an executable file is opened and read in the new process, and loaded in a memory, so that the application is executed. Accordingly, the execution start of an application can be identified by checking "open".

Figure 8:
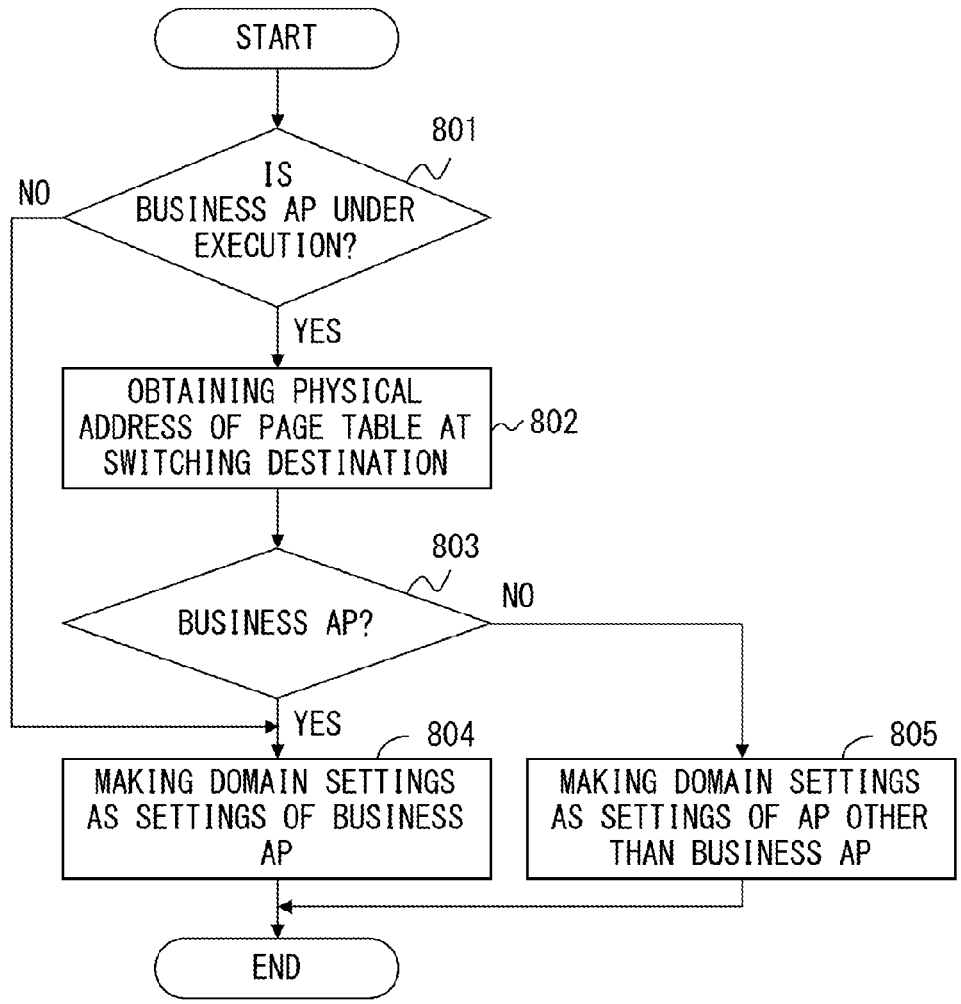
FIG. 8 is a flowchart illustrating a process of a first context switching processing unit.

FIG. 8 is a flowchart illustrating an example of a process executed by the context switching processing unit 232 of the hypervisor 202. The context switching processing unit 232 makes domain settings of the MMU 242 according to an AP running on the VM 201 by using the business AP information 221 and the domain information 223. Context switching (process switching) itself is performed by the OS 215 or the VM 201.

The context switching processing unit 232 starts the process at timing of the context switching performed by the OS 215. With a function of the CPU 241, a page table switching process when the context switching is performed is transferred to the hypervisor 202.

The context switching processing unit 232 initially checks whether or not a business AP is under execution by referencing the execution information in entries in the business AP information 221 (step 801). If the execution information is empty, it is determined that the business AP is not under execution. If the execution information is not empty, it is determined that the business AP is under execution.

If none of business APs in the entries are under execution ("NO" in step 801), domain settings for the business AP are made in the MMU 242 based on the domain information 223 (step 804).

Alternatively, if any of the business APs in the entries is under execution ("YES" in step 801), a physical address of a page table at a switching destination by the context switching is obtained (step 802). Here, since it is assumed that the context switching has been already performed, the physical address of the current page table is obtained.

Next, the physical address of the page table is compared with the execution information of the entries in the business AP information 221 (step 803). If the physical address of the page table matches any piece of the execution information of the entries ("YES" in step 803), the process in step 804 is executed.

Alternatively, if the physical address of the page table matches none of the execution information of the entries ("NO" in step 803), domain settings for the AP other than the business AP are made in the MMU 242 based on the domain information 223 (step 805). As a result, access prohibition is set for the domain numbers 0, 1, and 2 of FIG. 6 in the MMU 242, so that a domain fault is caused to occur at an access from the AP other than the business AP to these domains.

FIG. 9 is a flowchart illustrating an example of a process executed by the fault processing unit 233 of the hypervisor 202. The fault processing unit 233 determines whether or not to permit a memory access that has caused a fault by using the business AP information 221, the memory restriction information 222, and the domain information 223. If the access is permitted, subsequent memory accesses are allowed by converting a domain number. The fault processing unit 233 starts the process at timing when a fault occurs for a memory access in the VM 201.

The fault processing unit 233 initially obtains a physical address of the current page table (step 901), compares the physical address with execution information of the entries in the business AP information 221 (step 902). If the physical address of the page table matches any piece of the execution information of the entries ("YES" in step 902), the fault processing unit 233 notifies the VM 201 of the fault as that to be processed by the OS 215 (step 904).

Alternatively, if the physical address of the page table matches none of the execution information of the entries ("NO" in step 902), a type of the occurred fault is checked (step 903). If the occurred fault is not a domain fault ("NO" in step 903), the process in step 904 is executed.

If the occurred fault is a domain fault ("YES" in step 903), a virtual address at an access destination, which has caused the fault, is obtained from the MMU 242 (step 905). Then, an entry corresponding to the virtual address is obtained from the current page table (step 906).

Next, the domain number of the entry is checked (step 907). If the domain number is not a conversion domain number set in the domain number conversion table ("NO" in step 907), a physical address, which is an actual access destination, is acquired from the obtained entry (step 908). Then, whether or not accesses to the physical address and the virtual address that has caused the fault are permitted is checked (step 909).

If the accesses are not permitted ("NO" in step 909), the process in step 904 is executed. If the accesses are permitted ("YES" in step 909), the domain number of the obtained entry is changed to a conversion domain number according to the domain number conversion table, so that the current page table is updated (step 910). Then, the process of the VM 201 is resumed in the state prior to the occurrence of the fault (step 911).

For example, in the domain settings illustrated in FIG. 6, following a page table is set for the conversion domain numbers 5, 6, and 7 of FIG. 5. Therefore, a domain fault is prevented from occurring at an access from the AP other than the business AP to a domain after being changed by changing the domain numbers to conversion domain numbers.

Alternatively, if the domain number is a conversion domain number set in the domain number conversion table ("YES" in step 907), the process in step 904 is executed.

With such an information processing apparatus, an AP other than the business AP does not make an access to an area other than an access-permitted memory area when a business AP is under execution. Accordingly, an access from the AP other than the business AP to a memory area used by the business AP can be restricted while the business AP and the AP other than the business AP are under execution in one VM. Moreover, there is no need to provide another VM for the business AP, whereby memory consumption can be reduced.

Incidentally, the memory restriction information 222 can be dynamically generated in accordance with execution of a business AP in the information processing apparatus illustrated in FIG. 2. If access-restricted memory areas are different respectively for business APs, the memory restriction information 222 can be easily set by being dynamically generated.

Figure 10:
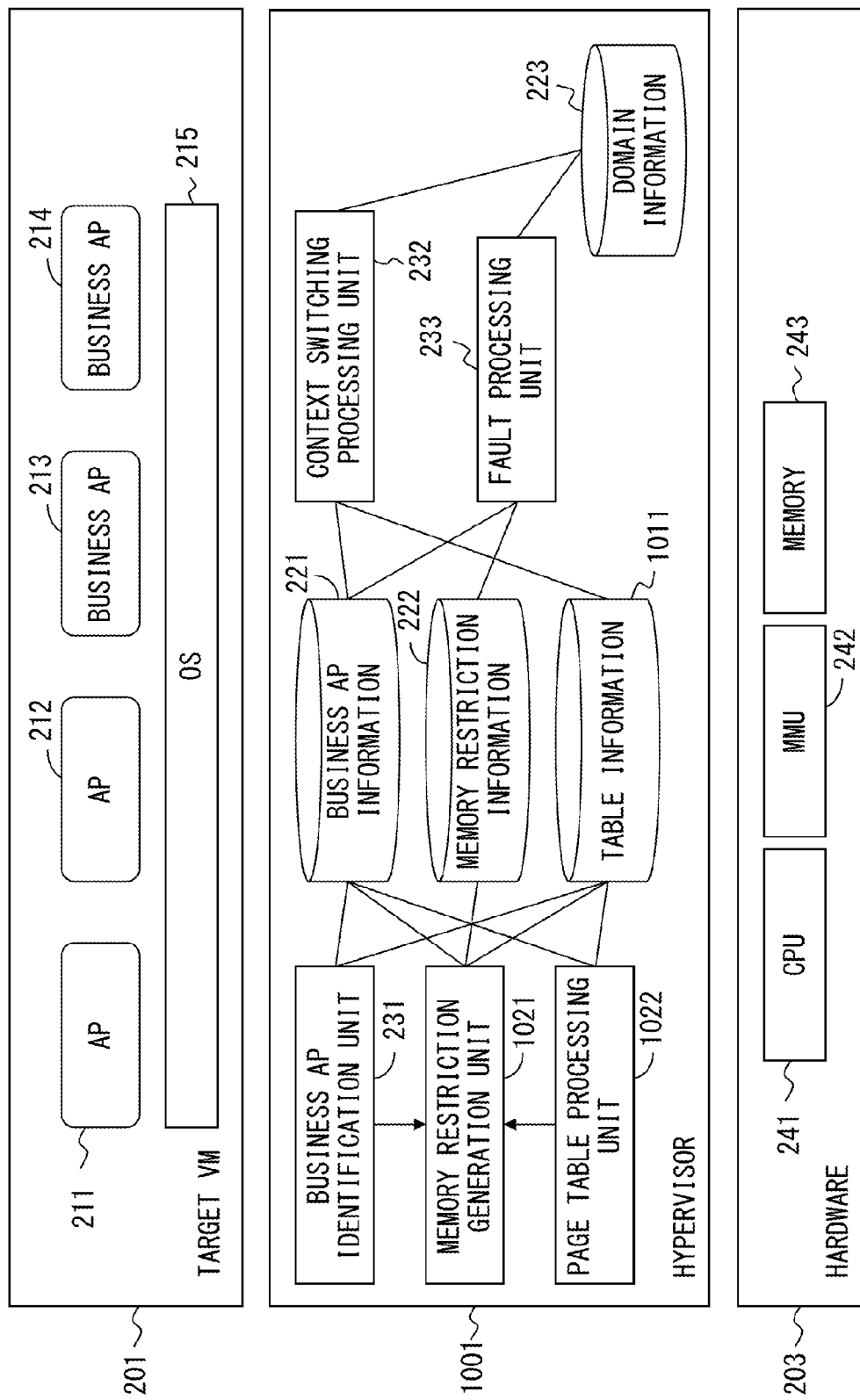
FIG. 10 illustrates a configuration of functions and hardware of a third information processing apparatus.

FIG. 10 illustrates a configuration example of functions and hardware of such an information processing apparatus. The information processing apparatus illustrated in FIG. 10 has a configuration implemented by replacing the hypervisor 202 of FIG. 2 with a hypervisor 1001.

The hypervisor 1001 includes a memory restriction generation unit 1021 and a page table processing unit 1022 in addition to the business AP identification unit 231, the context switching processing unit 232 and the fault processing unit 233, which are illustrated in FIG. 2. The hypervisor 1001 performs a memory access control by using the business AP information 221, the memory restriction information 222, the domain information 223, and table information 1011.

FIG. 11 illustrates an example of the business AP information 221. The business AP information illustrated in FIG. 11 includes a prohibited physical address, a prohibited virtual address, and a permitted virtual address in addition to the business AP identification information and the execution information, which are illustrated in FIG. 3. The prohibited physical address, the prohibited virtual address, and the permitted virtual address are preset as access restrictions. Entries 1101 and 1102 respectively represent the business AP information of the business APs 213 and 214.

The prohibited physical address represents a physical address area for which an access from an AP other than the business AP in a corresponding entry is denied. The prohibited virtual address represents a virtual address area for which the access from the AP other than the business AP is denied. The permitted virtual address represents a virtual address area for which the access from the AP other than the business AP is permitted. A plurality of areas can be specified respectively for the prohibited physical address, the prohibited virtual address, and the permitted virtual address.

FIG. 12 illustrates an example of the table information 1011. The table information illustrated in FIG. 12 includes a pair of page table information and replacement page table information. The page table information represents a physical address of a page table of the AP other than the business AP. The replacement page table information represents a physical address of a replacement page table intended to replace a page table of the AP other than the business AP when the business AP is under execution.

An entry 1201 of FIG. 12 indicates that a page table of a physical address 0x80020000 is replaced with a replacement page table of a physical address 0x81020000 when the business AP is executed. Moreover, an entry 1202 indicates that a page table of a physical address 0x80028000 is replaced with a replacement page table of a physical address 0x81028000 when the business AP is executed.

Figure 13:
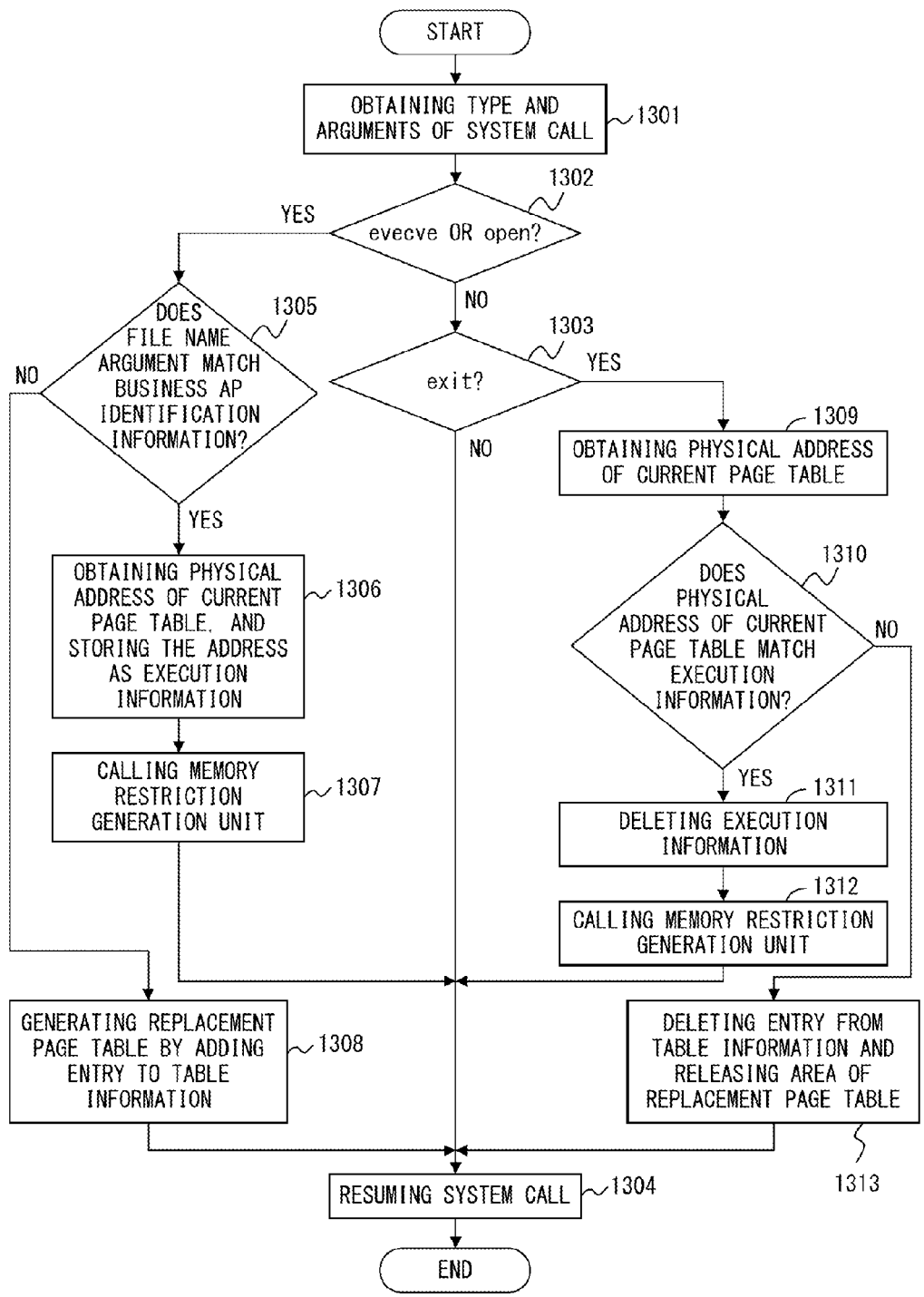
FIG. 13 is a flowchart illustrating a process of a second business AP identification unit.

FIG. 13 is a flowchart illustrating an example of a process executed by the business AP identification unit 231 of the hypervisor 1001. Processes in steps 1301 to 1306 and 1309 to 1311 illustrated in FIG. 13 are similar to those in steps 701 to 706 and 707 to 709 illustrated in FIG. 7.

The business AP identification unit 231 calls the memory restriction generation unit 1021 after the process in step 1306 (step 1307). Upon termination of the process of the memory restriction generation unit 1021, the process in step 1304 is executed.

Alternatively, if the file name argument of the system call matches none of file names of the entries in the business AP information 221 ("NO" in step 1305), an entry is added to the table information 1011 (step 1308). Then, the physical address of the current page table is set as page table information of the entry, a memory area for a replacement page table is secured, and the physical address is set as replacement page table information. Moreover, the current page table is copied to the replacement page table, and the process in step 1304 is executed.

Additionally, the memory restriction generation unit 1021 is called after the process in step 1311 (step 1312). Upon termination of the process of the memory restriction generation unit 1021, the process in step 1304 is executed.

Alternatively, if the physical address of the current page table matches none of the execution information of the entries in the business AP information 221 ("NO" in step 1310), the table information 1011 is referred to (step 1313). Then, an entry having page table information or replacement page table information, which matches the physical address of the current page table, is deleted from the table information 1011. Moreover, the memory area of the replacement page table, which is indicated by the replacement page table information in that entry, is released, and the process in step 1304 is executed.

Figure 14:
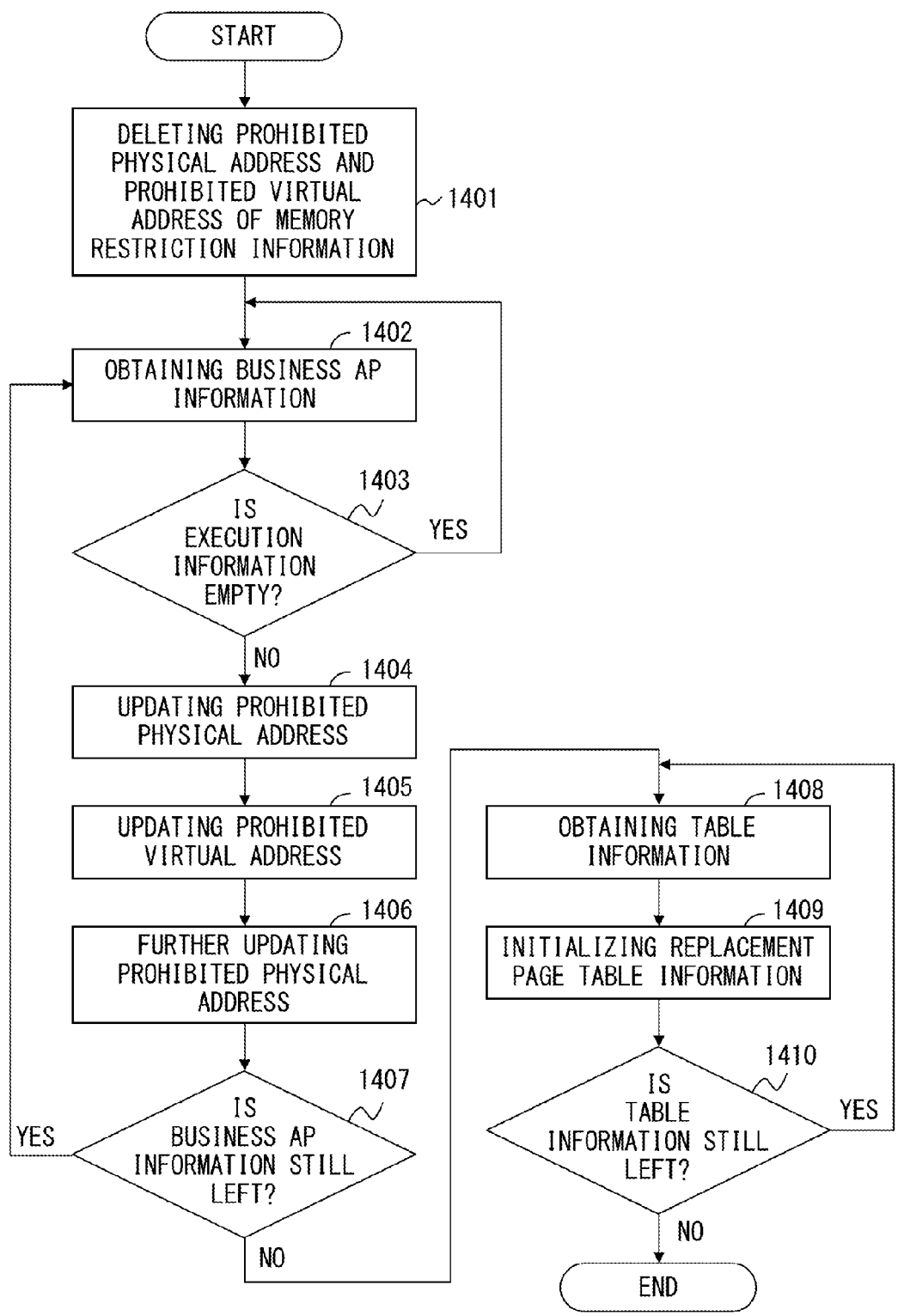
FIG. 14 is a flowchart illustrating a process of a first memory restriction generation unit.

FIG. 14 is a flowchart illustrating an example of a process, executed by the memory restriction generation unit 1021 of the hypervisor 1001, for updating memory restriction information 222. The memory restriction generation unit 1021 generates memory restriction information 222 from access restrictions of a business AP currently under execution based on the business AP information 221, and initializes contents of a replacement page table of an AP other than the business AP when the memory restriction information 222 is updated. The memory restriction generation unit 1021 is called by the business AP identification unit 231 or the page table processing unit 1022, and starts the process.

The memory restriction generation unit 1021 empties the memory restriction information 222 by initially deleting prohibited physical addresses and prohibited virtual addresses of the memory restriction information 222 (step 1401).

Next, entries of the business AP information 221 are repeatedly processed one by one. One of the entries in the business AP information 221 is obtained (step 1402), and whether or not execution information of the entry is empty is checked (step 1403). If the execution information is empty ("YES" in step 1403), the next entry is obtained.

If the execution information of the entry is not empty ("NO" in step 1403), a sum (OR) of the prohibited physical address of the memory restriction information 222 and that of the entry in the business AP information 221 is obtained, and an ORed result is set as the prohibited physical address of the memory restriction information 222 (step 1404). The sum of the two address areas represents an address area that covers both of the entire address areas.

Next, a sum of the prohibited virtual address of the memory restriction information 222 and that of the business AP information 221 is obtained, and an ORed result is set as the prohibited virtual address of the memory restriction information 222 (step 1405).

Then, a physical address area, corresponding to the virtual address area excluding the areas of the prohibited virtual address and the permitted virtual address in an entry of the business AP information 221, in a page table set as the execution information of the entry is obtained (step 1406). Then, a sum of the obtained physical address area and the prohibited physical address of the memory restriction information 222 is obtained, and the sum is set as the prohibited physical address of the memory restriction information 222.

Next, whether or not an entry yet to be processed is left in the business AP information 221 is checked (step 1407). If an entry yet to be processed is left ("YES" in step 1407), the processes in and after step 1402 are repeated.

If no entry yet to be processed is left ("NO" in step 1407), the entries in the table information 1011 are repeatedly processed one by one. One of the entries in the table information 1011 is obtained (step 1408), and replacement page table information is initialized by copying the page table information of that entry to the replacement page table information (step 1409).

Then, whether or not an entry yet to be processed is left in the table information 1011 is checked (step 1410). If an entry yet to be processed is left ("YES" in step 1410), the processes in and after step 1408 are repeated. If no entry yet to be processed is left ("NO" in step 1410), the process is terminated. As a result, the process at the call source is resumed.

FIGS. 15 and 16 illustrate an example of a page table of each of the business APs 213 and 214. If only the business AP 213 is executed, the memory restriction generation unit 1021 sets prohibited physical addresses 0x4000000 to 0x5FFFFFFF in the entry 1101 of FIG. 11 as the prohibited physical address of the memory restriction information 222. As a result, the prohibited physical addresses 0x4000000 to 0x5FFFFFFF is set as the memory restriction information 222 as illustrated in FIG. 17.

Next, a prohibited virtual address 0x70000000 to 0x700FFFFF in the entry 1101 is set as the prohibited virtual address of the memory restriction information 222. As a result, prohibited virtual addresses 0x70000000 to 0x700FFFFF illustrated in FIG. 17 are set.

Next, the page table illustrated in FIG. 15 is referred to based on the execution information in the entry 1101, and an area excluding the prohibited virtual addresses 0x70000000 to 0x700FFFFF and the permitted virtual addresses 0x60000000 to 0x6FFFFFFF in the entry 1101 is obtained. By excluding the prohibited virtual addresses and the permitted virtual addresses in the entry 1101 from the virtual addresses illustrated in FIG. 15, 0x00000000 to 0x000FFFFF and 0x70100000 to 0x7FFFFFFF are obtained.

Accordingly, physical addresses 0x80200000 to 0x802FFFFF and 0xA0100000 to 0xAFFFFFFF, which correspond to the obtained virtual addresses, are set as the prohibited physical addresses of the memory restriction information 222 in the page table illustrated in FIG. 15. As a result, the prohibited physical addresses 0x80200000 to 0x802FFFFF and 0xA0100000 to 0xAFFFFFFF, which are illustrated in FIG. 17, are set.

If both of the business APs 213 and 214 are executed, the memory restriction generation unit 1021 generates memory restriction information 222 like that illustrated in FIG. 17 for the business AP 213. Then, the memory restriction generation unit 1021 executes a similar process for the business AP 214.

Since the prohibited physical address in the entry 1102 illustrated in FIG. 11 is empty, no prohibited physical address is set in step 1404.

Next, the prohibited virtual addresses 0x81200000 to 0x812FFFFF in the entry 1102 are set as the prohibited virtual addresses of the memory restriction information 222. As a result, the prohibited virtual addresses 0x81200000 to 0x812FFFFF are set as the memory restriction information 222 as illustrated in FIG. 18.

Next, an area excluding the prohibited virtual addresses 0x81200000 to 0x812FFFFF and the permitted virtual addresses 0x60000000 to 0x600FFFFF in the entry 1102 is obtained by referring to the page table illustrated in FIG. 16 based on the execution information in the entry 1102. By excluding the prohibited virtual addresses and the permitted virtual addresses in the entry 1102 from the virtual addresses illustrated in FIGS. 16, 0x00000000 to 0x001FFFFF and 0x60100000 to 0x811FFFFF are obtained.

Accordingly, the physical addresses 0x80300000 to 0x804FFFFF and 0x90100000 to 0xB11FFFFF, which correspond to the obtained virtual addresses in the page table illustrated in FIG. 16, are set as the prohibited physical addresses of the memory restriction information 222. As a result, the prohibited physical addresses 0x80300000 to 0x804FFFFF and 0x90100000 to 0xB11FFFFF, which are illustrated in FIG. 18, are set. At this time, the already set prohibited physical addresses 0xA0100000 to 0xAFFFFFFF illustrated in FIG. 17 are included in 0x90100000 to 0xB11FFFFF. Therefore, 0xA0100000 to 0xAFFFFFFF are deleted.

Figure 19:
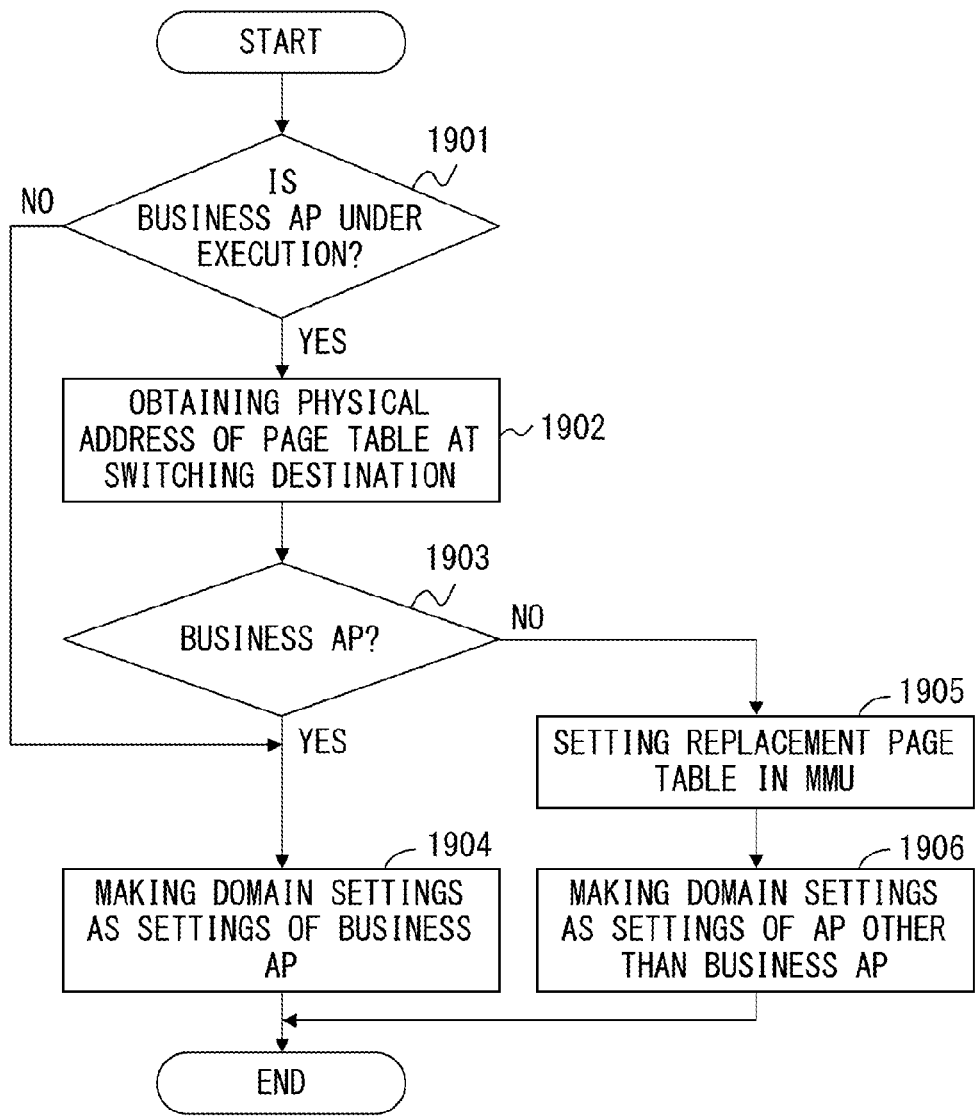
FIG. 19 is a flowchart illustrating a process of a second context switching processing unit.

FIG. 19 is a flowchart illustrating an example of a process executed by the context switching processing unit 232 of the hypervisor 1001. Processes in steps 1901 to 1904 and 1906 of FIG. 19 are similar to those in steps 801 to 805 of FIG. 8.

The context switching processing unit 232 executes a process in step 1905 if the physical address of the current page table matches none of the execution information of the entries in the business AP information 221 ("NO" in step 1903). In step 1905, an entry including page table information that matches the physical address of the current page table is referred to in the table information 1011, and replacement page table information in the entry is obtained. Then, a replacement page table indicated by the replacement page table information is set in the MMU 242, and the process instep 1906 is executed.

Note that the addition of an entry to the table information 1011 in step 1308 of FIG. 13 can be performed also by the context switching processing unit 232. In this case, the context switching processing unit 232 adds an entry instep 1905 if the entry of the table information 1011, which matches the physical address of the current page table, is not present. Then, the physical address of the current page table is set as the page table information of the entry, a memory area for the replacement page table is secured, and the physical address of the memory area is set as the replacement page table information. Moreover, the current page table is copied to the replacement page table.

A process executed by the fault processing unit 233 of the hypervisor 1001 is similar to that of the flowchart illustrated in FIG. 9.

Figure 20:
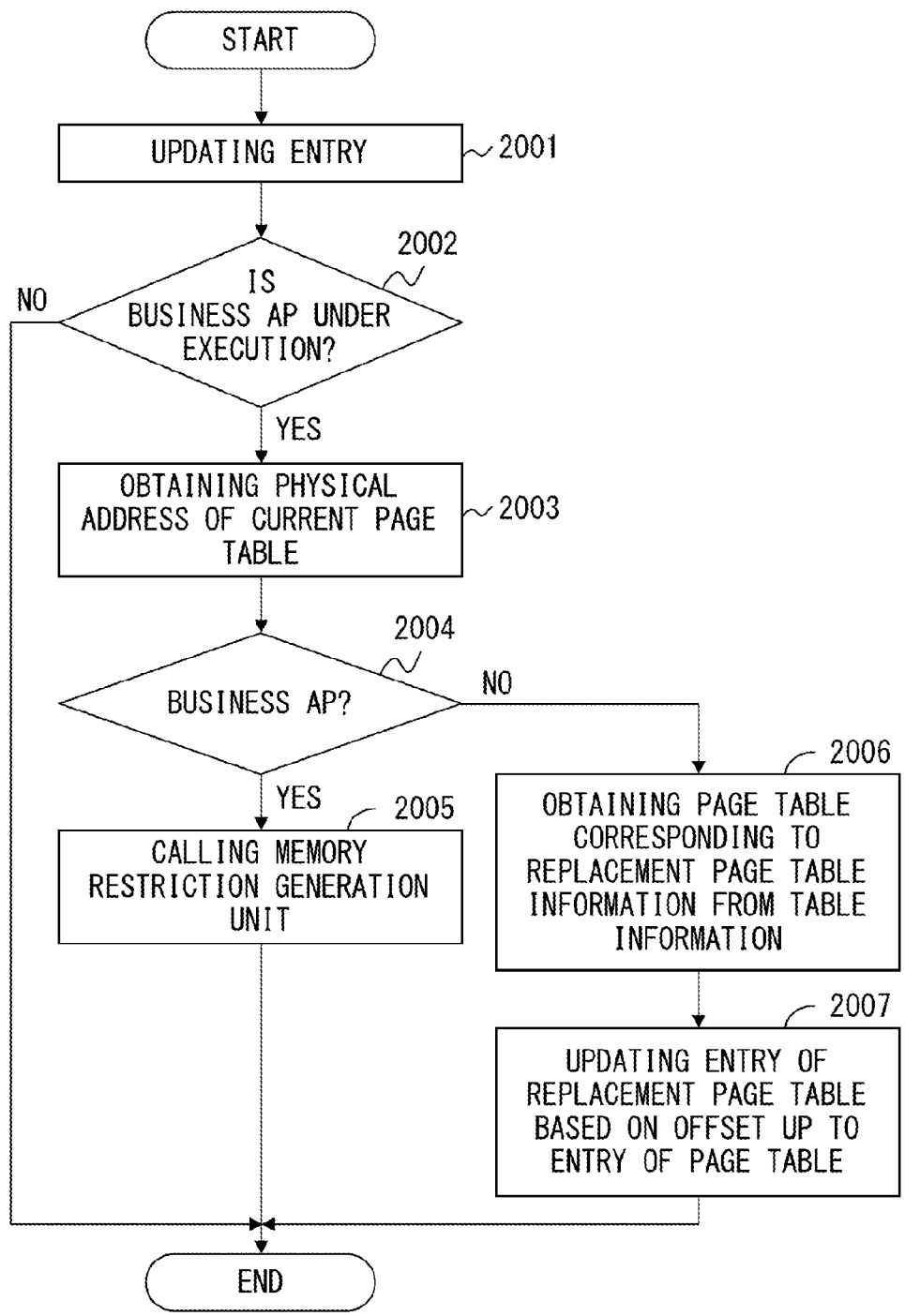
FIG. 20 is a flowchart illustrating a process of a first page table processing unit.

FIG. 20 is a flowchart illustrating an example of a process executed by the page table processing unit 1022 of the hypervisor 1001. The page table processing unit 1022 changes a replacement page table when the OS 215 running on the VM 201 changes a page table of an AP other than the business AP. Moreover, the page table processing unit 1022 regenerates memory restriction information 222 when the OS 215 changes the page table of the business AP.

The page table processing unit 1022 starts the process at timing when the OS 215 changes the page table. For example, in a para-virtualization system, a request to change a page table can be made to the hypervisor 1001 with a hyper call, which is a system call, when the OS 215 changes the page table. Accordingly, the page table processing unit 1022 starts the process at the timing when a hyper call is issued.

In contrast, in a full-virtualization system, a method of causing a page fault to occur is considered to be employed in order to transfer the process to the hypervisor 1001 for the change of the page table in the VM 201. In this case, a virtual address on which a physical address used as the current page table is mapped is obtained when the business AP identification unit 231 identifies the current page table. Then, an access to the virtual address is changed to "read only". As a result, a page fault is caused to occur when the OS 215 makes an access to change the page table.

In a case of multi-level paging, a virtual address is obtained from a physical address of a page table at or after a second level, which is referenced by a page table at a first level, and an access to the virtual address is changed to "read only". Also if the page table processing unit 1022 adds an entry of the page table at or after the second level, an access is changed to "read only" similarly.

The page table processing unit 1022 initially updates an entry of a page table to be changed (step 2001). At this time, in a para-virtualization system, an entry specified by a hyper call is updated. In contrast, in a full-virtualization system, an instruction to be executed is obtained from an execution address when a page fault occurs, and an entry specified by the instruction is updated.

Next, whether or not a business AP is under execution is checked by referring to execution information of entries in the business AP information 221 (step 2002). If none of business APs in the entries are under execution ("NO" in step 2002), the process is terminated.

Alternatively, if any of the business APs of the entries is under execution ("YES" in step 2002), a physical address of the current page table is obtained (step 2003). Then, the physical address of the page table is compared with execution information of the entries in the business AP information 221 (step 2004). If the physical address of the page table matches any piece of the execution information of the entries ("YES" in step 2004), the memory restriction generation unit 1021 is called (step 2005).

Alternatively, if the physical address of the page table matches none of the execution information of the entries ("NO" in step 2004), an entry including page table information that matches the physical address is referred to in the table information 1011 (step 2006). Then, replacement page table information of the entry is obtained. Next, an offset up to the updated entry within the page table to be changed is obtained, and an entry having the same offset within the replacement page table is updated similarly (step 2007).

Since a domain number of an ARM processor can be set only in the page table at the first level, there is no need to provide a replacement page table for the page table at the second level. Accordingly, the page table used by the VM 201 is available unchanged as the page table at the second level.

With such an information processing apparatus, the memory restriction information 222 can be dynamically generated in accordance with execution of a business AP, whereby the bounds of a memory area for which an access is restricted can be suitably maintained.

If the memory restriction information 222 generated with the process of FIG. 14 is the same as the memory restriction information 222 before being updated, the processes in steps 1408 to 1410 may be omitted. Moreover, whether or not an update of an entry in a page table influences the memory restriction information 222 may be determined based on the business AP information 221, and the memory restriction generation unit 1021 may be called if the update influences the memory restriction information 222.

Incidentally, the information processing apparatus illustrated in FIG. 2 or 10 performs the memory access control by using domain settings. However, an information processing apparatus that does not have domain settings can perform a similar memory access control.

Figure 21:
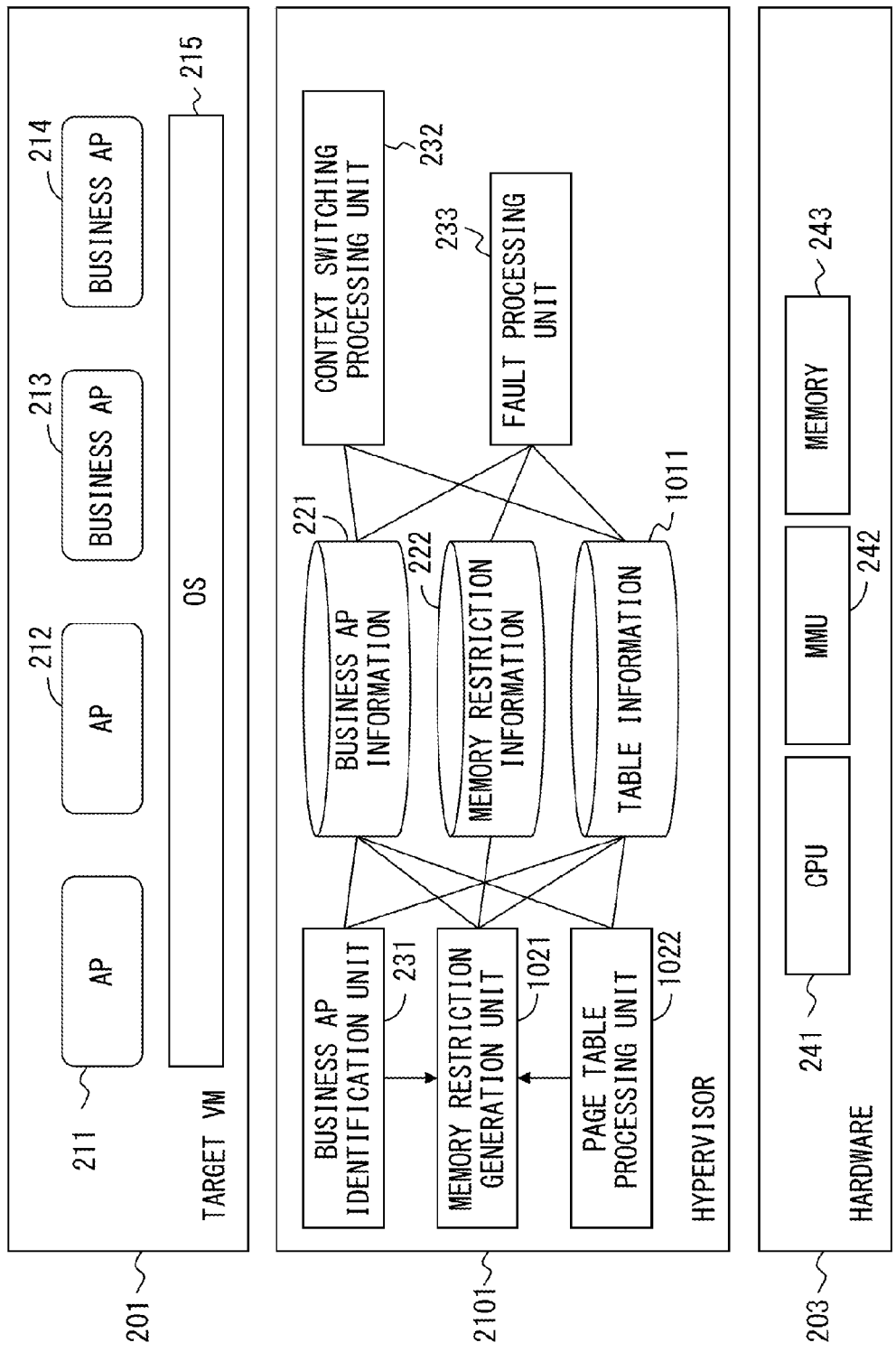
FIG. 21 illustrates a configuration of functions and hardware of a fourth information processing apparatus.

FIG. 21 illustrates a configuration example of functions and hardware of such an information processing apparatus. The information processing apparatus illustrated in FIG. 21 has a configuration implemented by replacing the hypervisor 1001 illustrated in FIG. 10 with a hypervisor 2101.

The hypervisor 2101 includes the business AP identification unit 231, the context switching processing unit 232, the fault processing unit 233, the memory restriction generation unit 1021 and the page table processing unit 1022, which are illustrated in FIG. 10. The hypervisor 2101 performs a memory access control by using the business AP information 221, the memory restriction information 222, and the table information 1011.

FIG. 22 illustrates an example of the table information 1011. The table information illustrated in FIG. 22 includes second level page table information in addition to the page table information and the replacement page table information, which are illustrated in FIG. 12. The second level page table information represents a physical address of a page table at and after the second level, which is referenced by a replacement page table.

If page tables at and after the second level are of a fixed size, there is no need to hold the size as the table information. If page tables of a plurality of sizes are used, the sizes may be held as the table information.

The page table information and the replacement page table information in an entry 2201 illustrated in FIG. 22 are similar to the entry 1201 illustrated in FIG. 12. The second page table information in an entry 2201 indicates that two page tables stored at physical addresses 0x81050000 and 0x81051000 are used as page tables at the second level.

The page table information and the replacement page table information in the entry 2202 are similar to the entry 1202 illustrated in FIG. 12. The second level page table information in the entry 2202 indicates that the page table stored at a physical address 0x81057000 is used as a page table at the second level.

Figure 23:
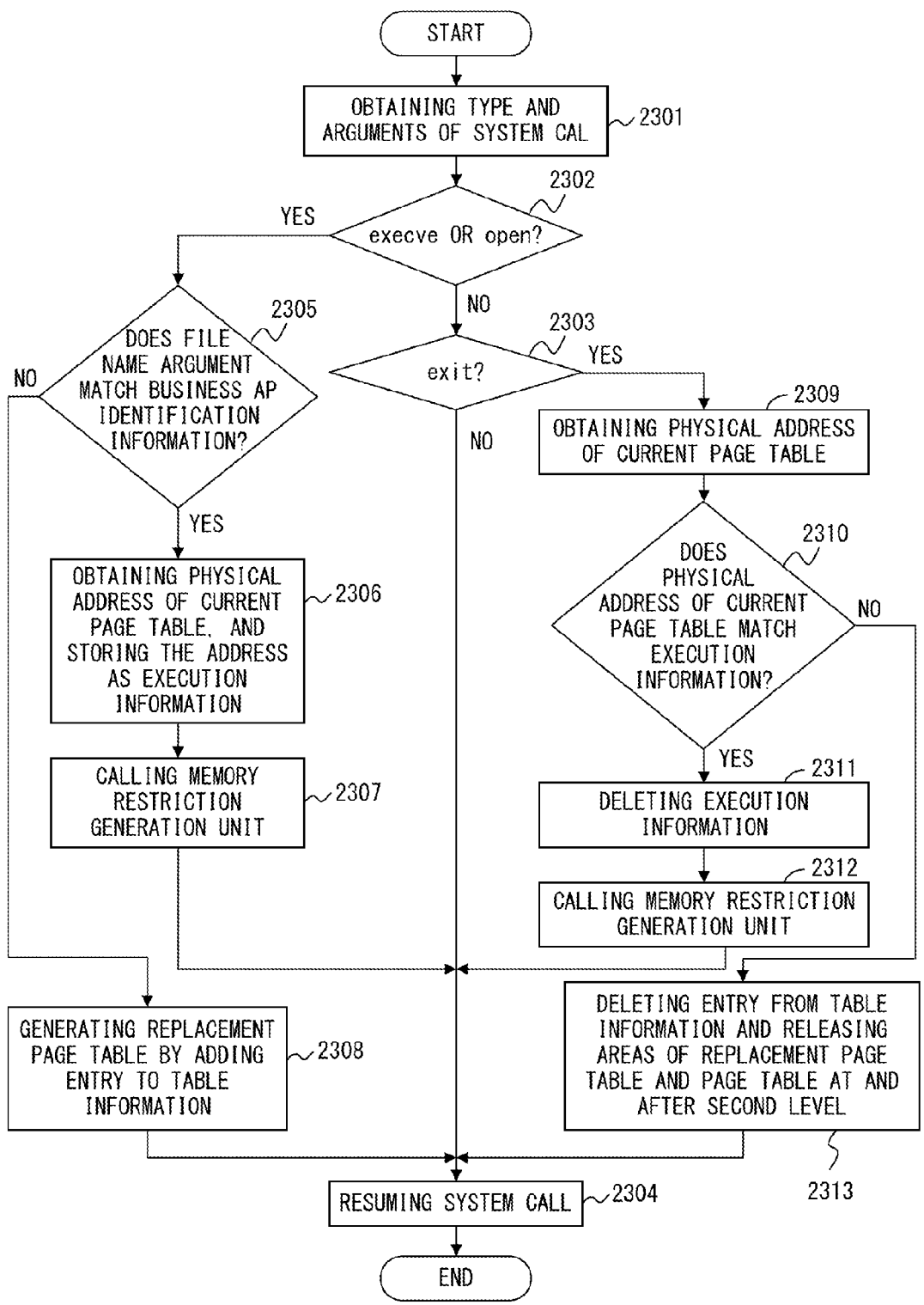
FIG. 23 is a flowchart illustrating a process of a third business AP identification unit.

FIG. 23 is a flowchart illustrating an example of a process executed by the business AP identification unit 231 of the hypervisor 2101. Processes in steps 2301 to 2307 and 2309 to 2312 illustrated in FIG. 23 are similar to those in steps 1301 to 1307 and 1309 to 1312 illustrated in FIG. 13.

The business AP identification unit 231 adds an entry to the table information 1011 if a filename argument of a system call matches none of file names of entries in the business AP information 221 ("NO" in step 2305). Then, a physical address of the current page table is set as the page table information of the entry, a memory area for a replacement page table is secured, and the physical address is set as replacement page table information. Moreover, contents of the replacement page table are emptied, and a process in step 2304 is executed.

Alternatively, if the physical address of the current page table matches none of the execution information of the entries in the business AP information 221 ("NO" in step 2310), the table information 1011 is referred to (step 2313). Then, an entry including page table information or replacement page table information, which matches the physical address of the current page table, is deleted from the table information 1011. Moreover, a memory area of the replacement page table, which is indicated by the replacement page table information of the entry, and a memory area of the page table at and after the second level, which is indicated by the second level page table information, are released, and the process in step 2304 is executed.

Figure 24:
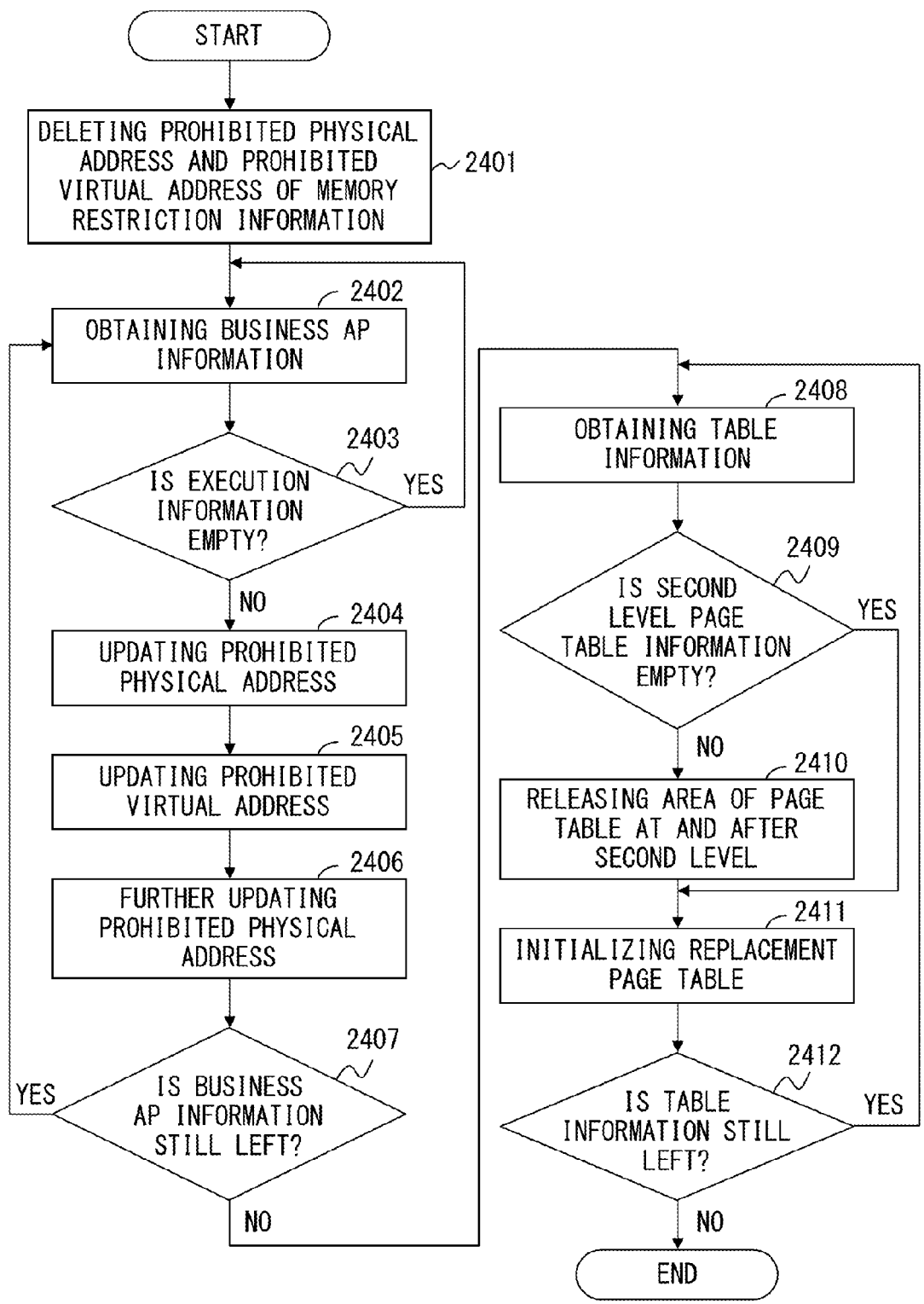
FIG. 24 is a flowchart illustrating a process of a second memory restriction generation unit.

FIG. 24 is a flowchart illustrating an example of a process executed by the memory restriction generation unit 1021 of the hypervisor 2101. Processes in steps 2401 to 2408 and 2412 illustrated in FIG. 24 are similar to those in steps 1401 to 1408 and 1410 illustrated in FIG. 14.

After the memory restriction generation unit 1021 obtains one of entries in the table information 1011 (step 2408), it checks whether or not second level page table information in the entry is empty (step 2409). If the second level page table information is not empty ("NO" in step 2409), a memory area of a page table at and after the second level, which is indicated by the second level page table information, is released (step 2410). Then, contents of the replacement page table indicated by the replacement page table information in the entry are emptied (step 2411). If the second level page table information is empty ("YES" in step 2409), the processes in and after step 2411 are executed.

Figure 25:
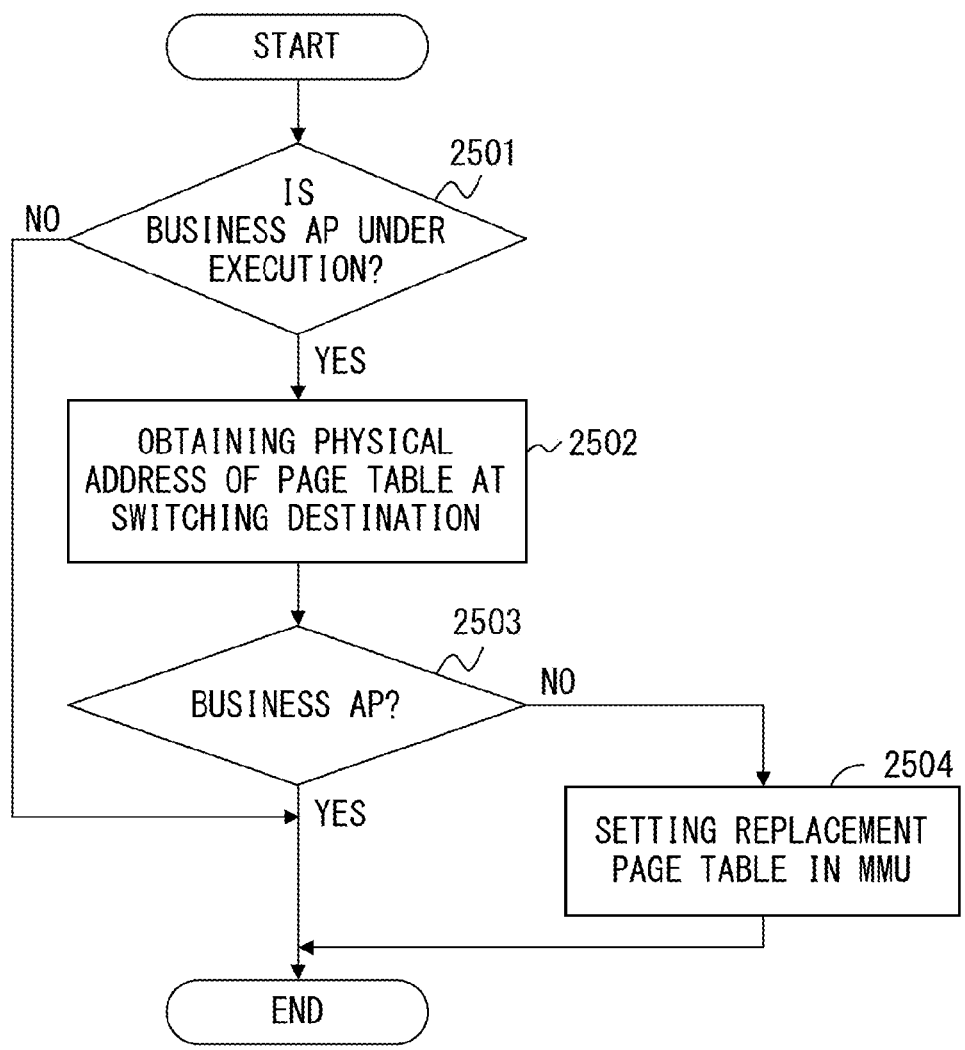
FIG. 25 is a flowchart illustrating a process of a third context switching processing unit.

FIG. 25 is a flowchart illustrating an example of a process executed by the context switching processing unit 232 of the hypervisor 2101. Processes in steps 2501 to 2503 and 2504 illustrated in FIG. 25 are similar to those in steps 1901 to 1903 and 1905 illustrated in FIG. 19.

If none of the business APs in the entries in the business AP information 221 are under execution ("NO" in step 2501), the context switching processing unit 232 terminates the process. In the meantime, if the physical address of the current page table matches any piece of the execution information in the entries ("YES" in step 2503), the context switching processing unit 232 terminates the process. Also after the process in step 2504, the context switching processing unit 232 terminates the process.

In step 2504, the replacement page table set to be empty in step 2308 or 2411 is set in the MMU 242. As a result, a fault is caused to occur when a memory access is made by an AP other than business AP.

Note that the addition of an entry in the table information 1011 in step 2308 of FIG. 23 can be performed also by the context switching processing unit 232. In this case, the context switching processing unit 232 adds an entry instep 2504 if there is no entry in the table information 1011, which matches the physical address of the current page table. Then, the physical address of the current page table is set as the page table information of the entry, a memory area for a replacement page table is secured, and the physical address is set as replacement page table information. Moreover, contents of the replacement page table are emptied.

Figure 26:
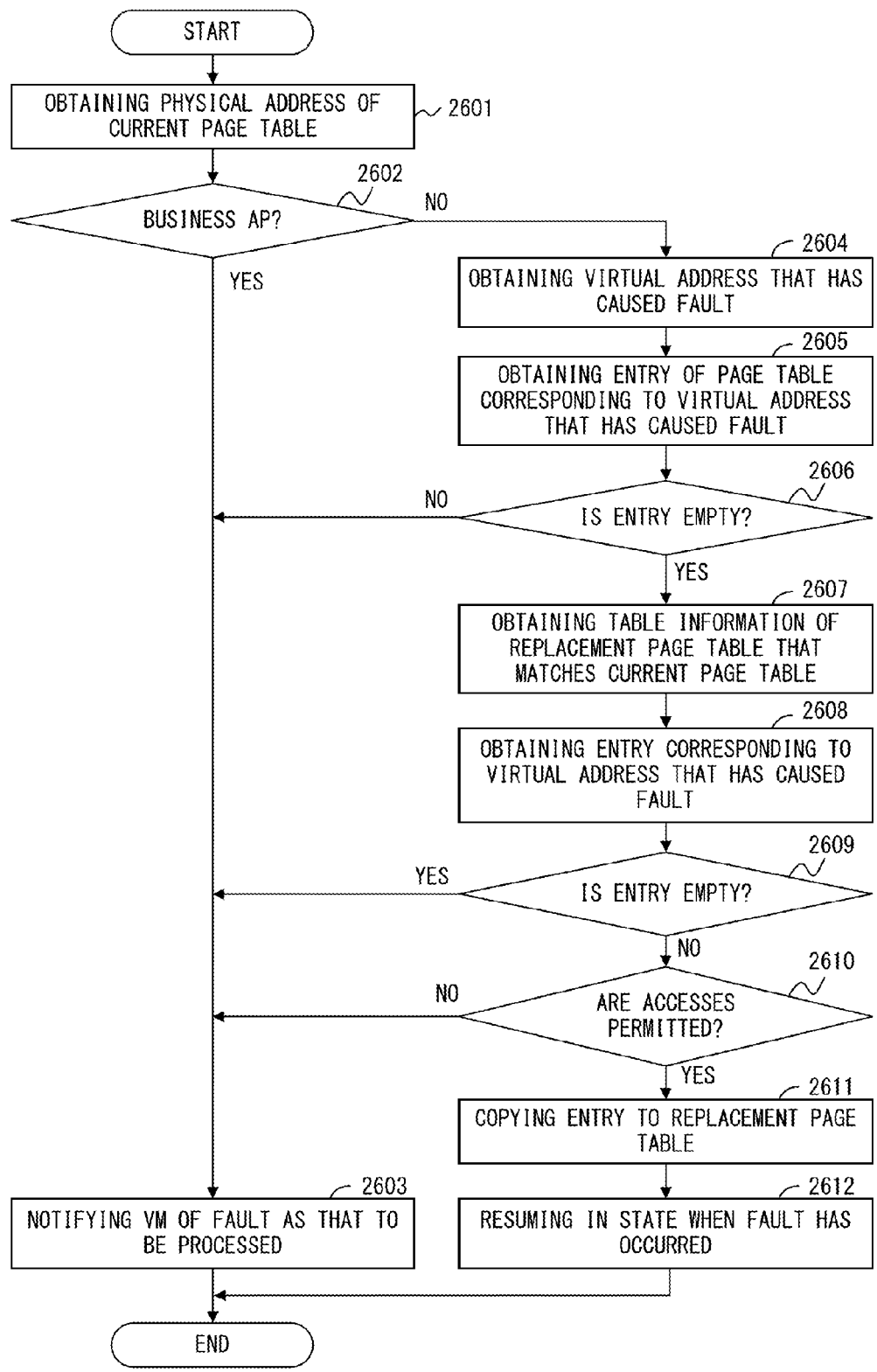
FIG. 26 is a flowchart illustrating a process of a second fault processing unit.

FIG. 26 is a flowchart illustrating an example of a process executed by the fault processing unit 233 of the hypervisor 2101. Processes insteps 2601 to 2602, 2603 to 2605, 2610, and 2612 illustrated in FIG. 26 are similar to those in steps 901 to 902, 904 to 906, 909, and 911 illustrated in FIG. 9.

If the physical address of the current page table matches any piece of the execution information of the entries in the business AP information 221 ("YES" in step 2602), the process in step 2603 is executed.

In the meantime, if a fault occurs while an AP other than the business AP is under execution, the current page table is a replacement page table. Therefore, the physical address of the replacement page table is obtained in step 2601. Accordingly, if the physical address of the current page table matches none of the execution information of the entries ("NO in step 2602), the processes in and after step 2604 are executed.

After an entry corresponding to a virtual address at an access destination, which has caused the fault, is obtained from the current page table (step 2605), whether or not the entry is empty is checked (step 2606). If the entry is not empty ("NO" in step 2606), the process in step 2603 is executed.

If the entry is empty ("YES" in step 2606), an entry including replacement page table information that matches the physical address of the current page table is referred to in the table information 1011, and page table information of the entry is obtained (step 2607). Then, the entry corresponding to the virtual address, which has caused the fault, is obtained from the page table indicated by the page table information (step 2608), and whether or not the entry is empty is checked (step 2609). If the entry is empty ("YES" in step 2609), the process in step 2603 is executed.

If the entry is not empty ("NO" in step 2609), a physical address, which is an actual access destination, is obtained from the entry. Then, whether or not accesses to the physical address and a virtual address that has caused the fault are permitted is determined based on the memory restriction information 222 (step 2610).

If the accesses are not permitted ("NO" in step 2610), the process in step 2603 is executed. If the accesses are permitted ("YES" in step 2610), the entry of the page table is copied to that of the replacement page table (step 2611), and the process in step 2612 is executed.

By copying the entry of the page table, which is specified by the table information 1011, to the entry of the replacement page table, a fault is prevented from occurring when a memory access is made from an AP other than the business AP.

If a fault occurs in an entry in a second level page table, the fault processing unit 233 secures a memory area for a new second level page table in step 2611. Then, an entry for referencing the new second level page table is generated as an entry of the replacement page table, and the entry of the second level page table referenced by the page table is copied to an entry of the new second level page table.

Figure 27:
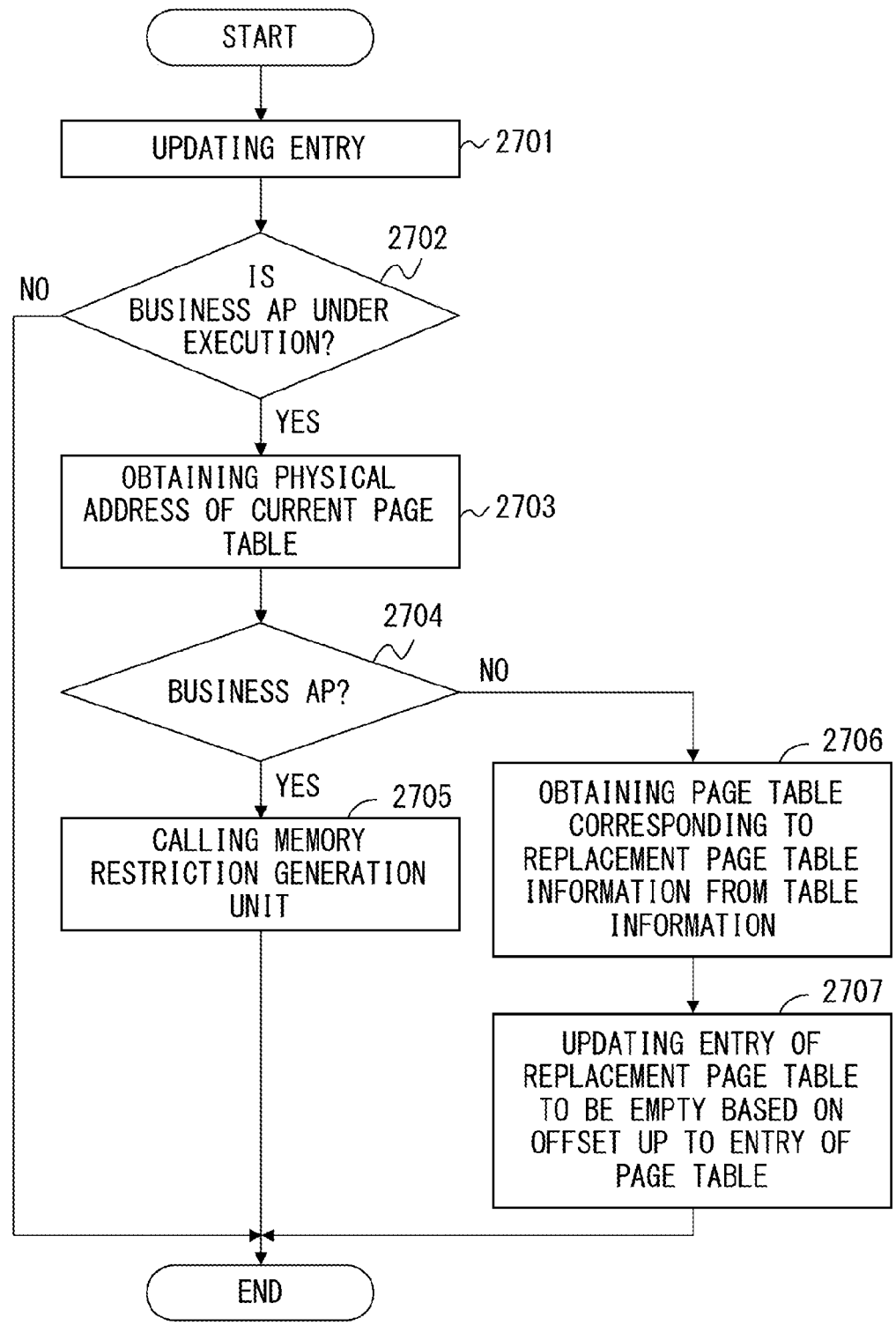
FIG. 27 is a flowchart illustrating a process of a second page table processing unit.

FIG. 27 is a flowchart illustrating an example of a process executed by the page table processing unit 1022 of the hypervisor 2101. Processes in steps 2701 to 2706 illustrated in FIG. 27 are similar to those insteps 2001 to 2006 illustrated in FIG. 20.

After the page table processing unit 1022 obtains replacement page table information from the table information 1011 (step 2706), it obtains an offset up to an updated entry within a page table to be changed (step 2707). Then, an entry having the same offset within the replacement page table is updated to be empty.

With such an information processing apparatus, the memory restriction information 222 can be dynamically generated in accordance with execution of a business AP similarly to the information processing apparatus illustrated in FIG. 10, so that the bounds of a memory area for which an access is restricted can be suitably maintained. Moreover, also an information processing apparatus that does not have domain settings can perform a memory access control.

If the memory restriction information 222 generated with the process of FIG. 24 is the same as the memory restriction information 222 before being updated, the processes in steps 2408 to 2412 may be omitted. Moreover, in the process illustrated in FIG. 27, whether or not an update of an entry in the page table influences the memory restriction information 222 may be determined based on the business AP information 221, and the memory restriction generation unit 1021 may be called if the update influences the memory restriction information 222.

FIG. 28 illustrates an example of a functional configuration of a further information processing apparatus. The information processing apparatus 2801 illustrated in FIG. 28 includes a storage unit 2811, and a control unit 2812.

The storage unit 2811 stores table information for replacing a conversion table intended to convert an intermediate physical address into a physical address of a memory with a replacement conversion table intended to restrict an access to a memory area used by a first program from a second program.

The control unit 2812 determines whether or not the first program is under execution when the second program is executed. If the first program is under execution, the replacement conversion table is set in the memory management unit based on the table information.

With such an information processing apparatus, an access from the second program to a memory used by the first program can be restricted while reducing memory consumption when the first program and the second program are executed.

Figure 29:
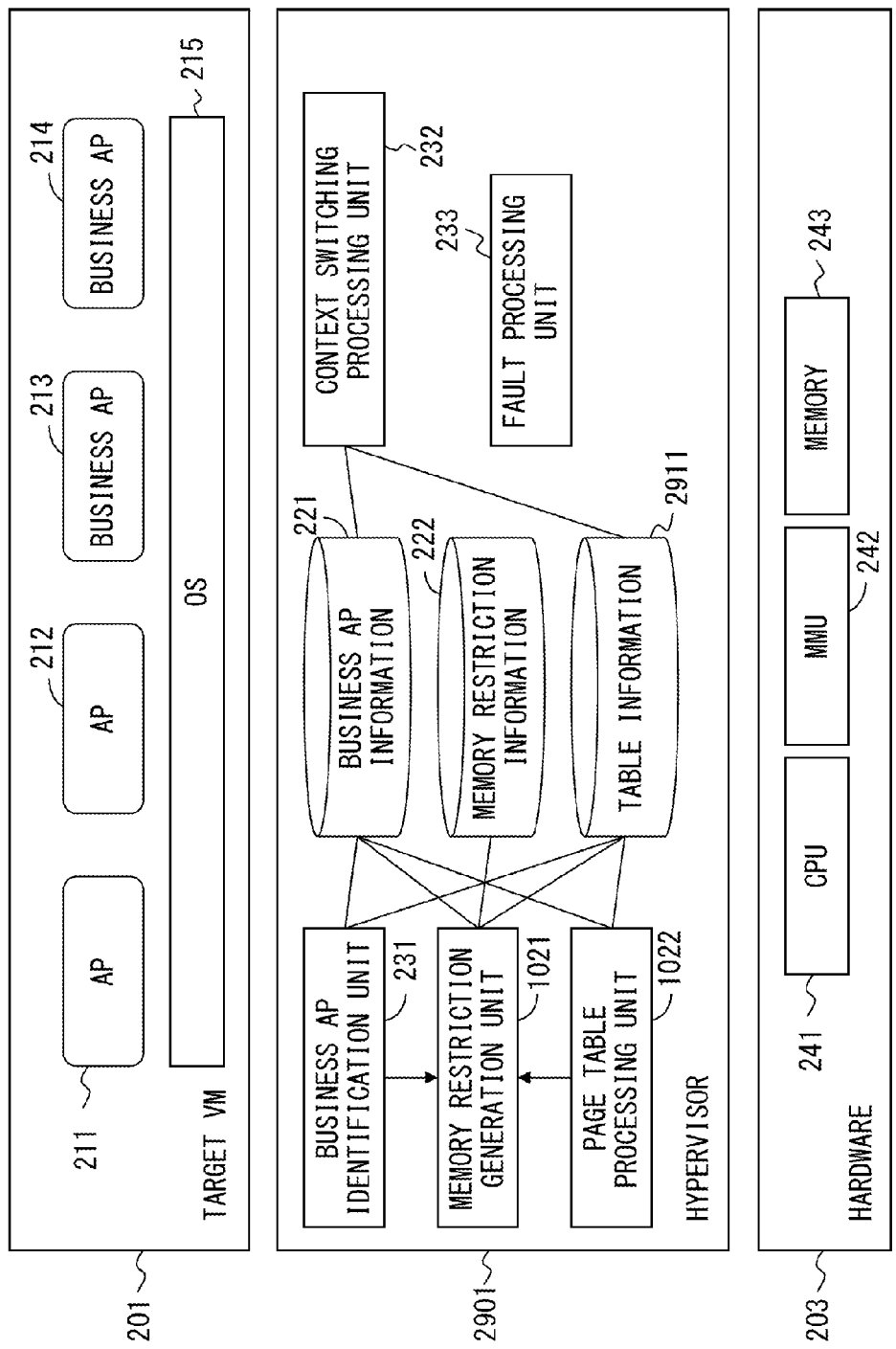
FIG. 29 illustrates a configuration of functions and hardware of a sixth information processing apparatus.

FIG. 29 illustrates a configuration example of functions and hardware of the information processing apparatus including the conversion table intended to convert an intermediate physical address into a physical address. The information processing apparatus illustrated in FIG. 29 has a configuration implemented by replacing the hypervisor 1001 illustrated in FIG. 10 with a hypervisor 2901.

The hypervisor 2901 includes the business AP identification unit 231, the context switching processing unit 232, the fault processing unit 233, the memory restriction generation unit 1021 and the page table processing unit 1022, which are illustrated in FIG. 10. The hypervisor 2901 performs a memory access control by using the business AP information 221, the memory restriction information 222, and table information 2911.

In the information processing apparatus illustrated in FIG. 29, the CPU 241 and the MMU 242 have a function of converting an intermediate physical address, which is a virtual physical address when viewed from the VM 201, into an actual physical address with hardware. A table used for this conversion is called a conversion table. By switching between conversion tables of a business AP and an AP other than business AP, the memory access control is performed. Moreover, an area of the memory 243, which is allocated to each VM, can be controlled by holding a conversion table for each VM.

FIG. 30 illustrates an example of the business AP information 221. The business AP information illustrated in FIG. 30 has a configuration implemented by excluding the prohibited virtual address from the business AP information illustrated in FIG. 11. Since the memory access control is performed by switching between conversion tables, an access restriction is set by using a physical address settable in the conversion tables. In this case, a prohibited virtual address related to an access restriction of a virtual address is not needed. A prohibited physical address and a permitted virtual address are used to obtain a prohibited physical address of the memory restriction information 222.

FIG. 31 illustrates an example of the memory restriction information 222. The memory restriction information illustrated in FIG. 31 has a configuration implemented by excluding the prohibited virtual address from the memory restriction information illustrated in FIG. 4. The memory restriction information 222 is preset for a business AP, or dynamically generated by the memory restriction generation unit 1021.

FIG. 32 illustrates an example of the table information 2911. The table information illustrated in FIG. 32 includes a pair of conversion table information and replacement conversion table information. The conversion table information indicates a physical address of a conversion table when a business AP is not under execution, or when a business AP is a current process while it is under execution. The replacement conversion table information indicates a physical address of a replacement conversion table intended to replace a conversion table when an AP other than the business AP is a current process while a business AP is under execution.

An entry 3201 illustrated in FIG. 32 indicates that a conversion table of a physical address 0x80020000 is replaced with a replacement conversion table of a physical address 0x80040000. A memory area of the replacement conversion table is secured in advance, for example, when the VM 201 starts to run.

FIG. 33 is a flowchart illustrating an example of a process executed by the business AP identification unit 231 of the hypervisor 2901. Processes in steps 3301 to 3311 illustrated in FIG. 33 are similar to those in steps 2301 to 2307 and 2309 to 2312 illustrated in FIG. 23.

The business AP identification unit 231 executes the process in step 3304 if a file name argument of a system call matches none of file names of entries in the business AP information 221 ("NO" in step 3305).

Additionally, if the physical address of the current page table matches none of execution information of the entries in the business AP information 221 ("NO" in step 3309), the process in step 3304 is executed.

Figure 34:
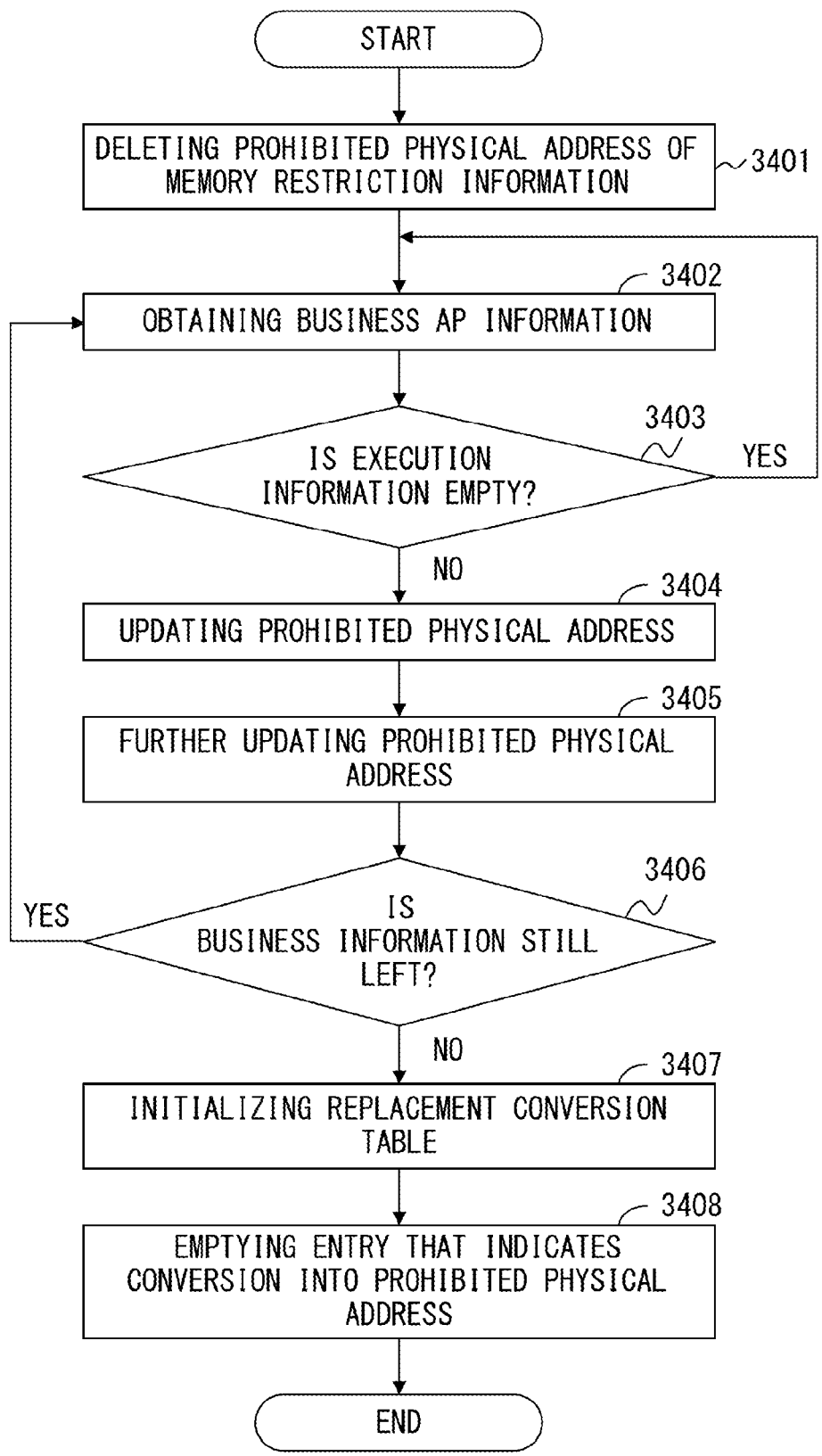
FIG. 34 is a flowchart illustrating a process of a third memory restriction generation unit.

FIG. 34 is a flowchart illustrating an example of a process executed by the memory restriction generation unit 1021 of the hypervisor 2901. The memory restriction generation unit 1021 generates memory restriction information 222 from an access restriction of a business AP currently under execution based on the business AP information 221, and updates contents of a replacement conversion table of an AP other than the business AP when the memory restriction information 222 is updated.

The memory restriction generation unit 1021 is called by the business AP identification unit 231 or the page table processing unit 1022, and starts the process.

The memory restriction generation unit 1021 empties the memory restriction information 222 by initially deleting a prohibited physical address in the memory restriction information 222 (step 3401).

Next, entries in the business AP information 221 are repeatedly processed one by one. One of the entries in the business AP information 221 is obtained (step 3402), and whether or not execution information of the entry is empty is checked (step 3403). If the execution information is empty ("YES" in step 3403), the next entry is obtained.

If the execution information of the entry is not empty ("NO" in step 3404), a sum of a prohibited physical address of the memory restriction information 222 and a prohibited physical address of the entry of the business AP information 221 is obtained, and the sum is set as a prohibited physical address of the memory restriction information 222 (step 3404).

Next, a physical address area corresponding to a virtual address area excluding a permitted virtual address area of the entry is obtained in a page table set as the execution information of the entry in the business AP information 221 (step 3405). Then, a sum of the obtained physical address area and the prohibited physical address of the memory restriction information 222 is obtained, and the sum is set as prohibited physical addresses of the memory restriction information 222.

Then, whether or not an entry yet to be processed is left in the business AP information 221 is checked (step 3406). If an entry yet to be processed is left ("YES" in step 3406), the processes in and after step 3402 are repeated.

If no entry yet to be processed is left ("NO" in step 3406), the replacement page table is initialized by copying contents of a conversion table indicated by the conversion table information of the table information 2911 to a replacement conversion table indicated by the replacement conversion table information (step 3407). Then, an entry that indicates a conversion into a prohibited physical address of the memory restriction information 222 among entries of the replacement conversion table is changed to be empty (step 3408), and the process is terminated. As a result, the process at the call source is resumed.

By changing an entry that indicates a conversion into a prohibited physical address to be empty in a replacement conversion table, a fault is caused to occur when a memory access is made from an AP other than business AP, so that the memory access can be restricted.

FIG. 35 is a flowchart illustrating an example of a process executed by the context switching processing unit 232 of the hypervisor 2901. Processes in steps 3501 to 3503 illustrated in FIG. 35 are similar to those in steps 2501 to 2503 illustrated in FIG. 25.

The context switching processing unit 232 sets a conversion table indicated by conversion table information in the table information 2911 in the MMU 242 (step 3504) if none of business APs of the entries in the business AP information 221 are under execution ("NO" in step 3501). Moreover, if a physical address of the current page table matches any piece of execution information of the entries ("YES" in step 3503), the process in step 3504 is executed.

Alternatively, if the physical address of the current page table matches none of the execution information of the entries ("NO" in step 3503), a replacement conversion table indicated by the replacement conversion table information of the table information 2911 is set in the MMU 242 (step 3505).

FIG. 36 is a flowchart illustrating an example of a process executed by the fault processing unit 233 of the hypervisor 2901.

In the configuration illustrated in FIG. 29, a memory access control is performed by switching between conversion tables of the business AP and the AP other than the business AP. Accordingly, there is no need to determine whether or not to permit an access. Therefore, if a fault occurs, the fault processing unit 233 notifies the VM 201 of the fault as that to be processed by the OS 215 (step 3601).

FIG. 37 is a flowchart illustrating an example of a process executed by the page table processing unit 1022 of the hypervisor 2901. Processes in steps 3701 to 3705 illustrated in FIG. 37 are similar to those in steps 2701 to 2705 illustrated in FIG. 27.

The page table processing unit 1022 terminates the process if the physical address of the current page table matches none of execution information of the entries in the business AP information 221 ("NO" in step 3704).

With such an information processing apparatus, an AP other than business AP cannot make an access to an area other than an access-permitted memory area while a business AP is under execution. Accordingly, an access from the AP other than business AP to a memory area used by the business AP can be restricted while the business AP, and the AP other than the business AP are under execution in one VM.

If the memory restriction information 222 generated with the process of FIG. 34 is the same as the memory restriction information 222 before being updated, the processes in steps 3407 to 3408 may be omitted. Moreover, whether or not an update of an entry in a page table influences the memory restriction information 222 may be determined based on the business AP information 221, and the memory restriction generation unit 1021 may be called if the update influences the memory restriction information 222.

Incidentally, a setting unit configured to set both or either of the memory restriction information and the access prohibition information in the memory 243 may be provided in the information processing apparatus illustrated in FIG. 1. Moreover, a setting unit configured to set the table information in the memory 243 may be provided in the information processing apparatus illustrated in FIG. 28.

Similarly, a setting unit configured to set all or some of the business AP information 221, the memory restriction information 222, and the domain information 223 in the memory 243 may be provided in the information processing apparatus illustrated in FIG. 2. Additionally, a setting unit configured to set both or either of the business AP information 221 and the table information 2911 in the memory 243 may be provided in the information processing apparatus illustrated in FIG. 10 or 21. Furthermore, a setting unit configured to set both or either of the business AP information 221 and the table information 2911 in the memory 243 may be provided in the information processing apparatus illustrated in FIG. 29.

Figure 38:
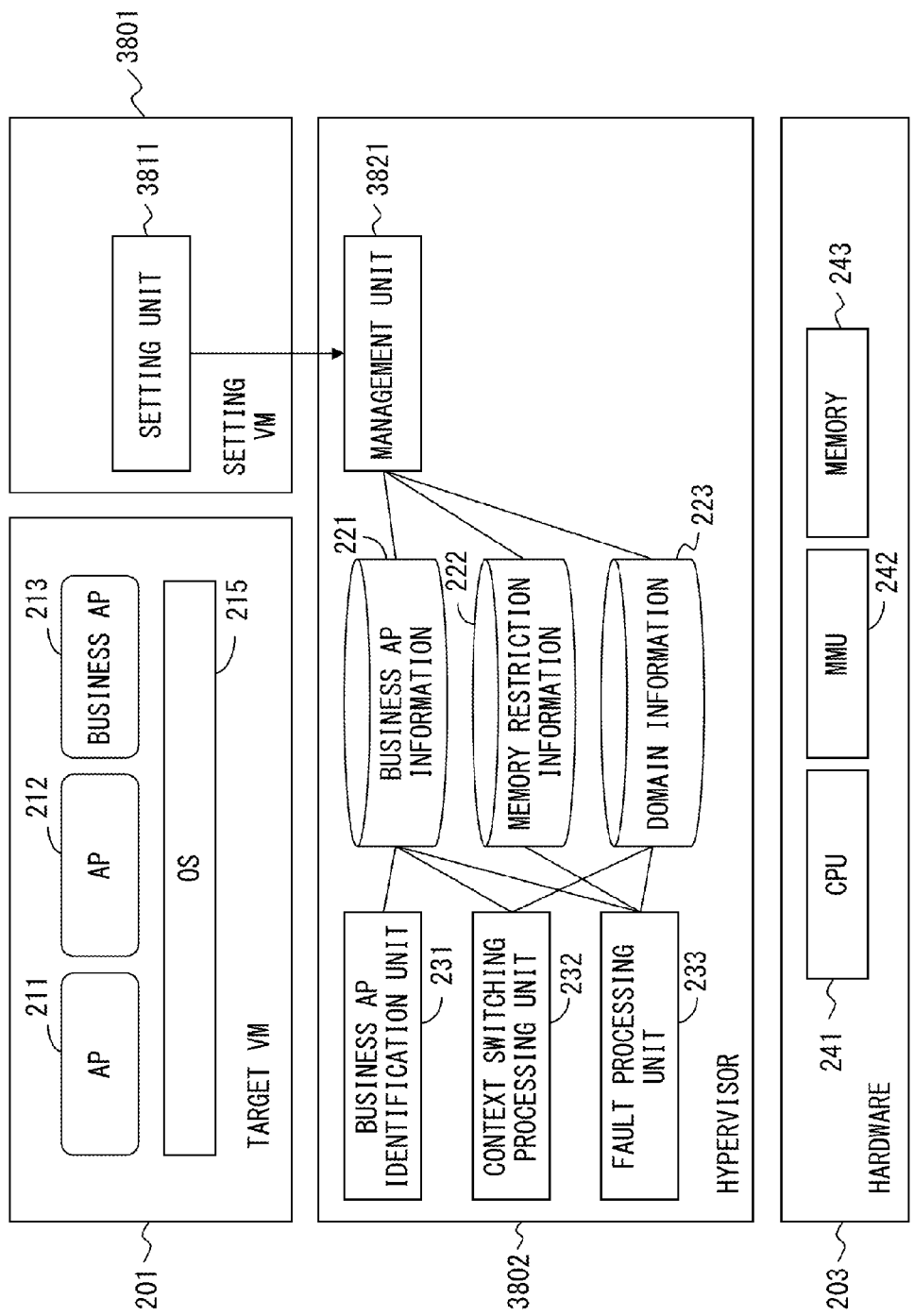
FIG. 38 illustrates a configuration of functions and hardware of a seventh information processing apparatus.

FIG. 38 illustrates a configuration example of functions and hardware of such an information processing apparatus. The information processing apparatus illustrated in FIG. 38 has a configuration implemented by adding a setting VM 3801 to the information processing apparatus illustrated in FIG. 2, and by replacing the hypervisor 202 with a hypervisor 3802.

The setting VM 3801 includes a setting unit 3811. The hypervisor 3802 includes a management unit 3821 in addition to the business AP identification unit 231, the context switching processing unit 232 and the fault processing unit 233, which are illustrated in FIG. 2.

The setting unit 3811 notifies the management unit 3821 of information set as the business AP information 221, the memory restriction information 222, and the domain information 223 according to an instruction of a user or an operator. The management unit 3821 sets the notified information as the business AP information 221, the memory restriction information 222, and the domain information 223 within the memory 243.

The information set as the business AP information 221 is business AP identification information, and the information set as the memory restriction information 222 is a prohibited physical address and a prohibited virtual address. The information set as the domain information 223 is a domain number. As a setting method, a method of rewriting the whole of the information or adding individual pieces of information is used. Moreover, information that becomes unnecessary can be deleted.

By providing the setting unit 3811 in the setting VM 3801 different from the target VM 201, a user or an operator can be prohibited from setting an AP other than business AP as a business AP. The setting unit 3811 can be provided in the target VM 201.

The setting unit 3811 sets various types of information at timing when a business AP is installed in the target VM 201. It is desirable to use a VM that is dedicated to an information setting process and consumes less of a memory as the setting VM 3811.

Also in the information processing apparatus illustrated in FIG. 1, 10, 21, 28, or 29, a setting unit can be provided similarly.

The flowcharts respectively represented by FIGS. 7 to 9, 13 to 14, 19 to 20, 23 to 27, and 33 to 37 are merely examples, and some of the processes may be omitted or modified according to a configuration or a condition of the information processing apparatus.

Not limited to a case where a business AP and an AP other than business AP are executed, an access to a memory area used by a first program from a second program can be restricted similarly also in a case where the first program and the second program are executed.

Figure 39:
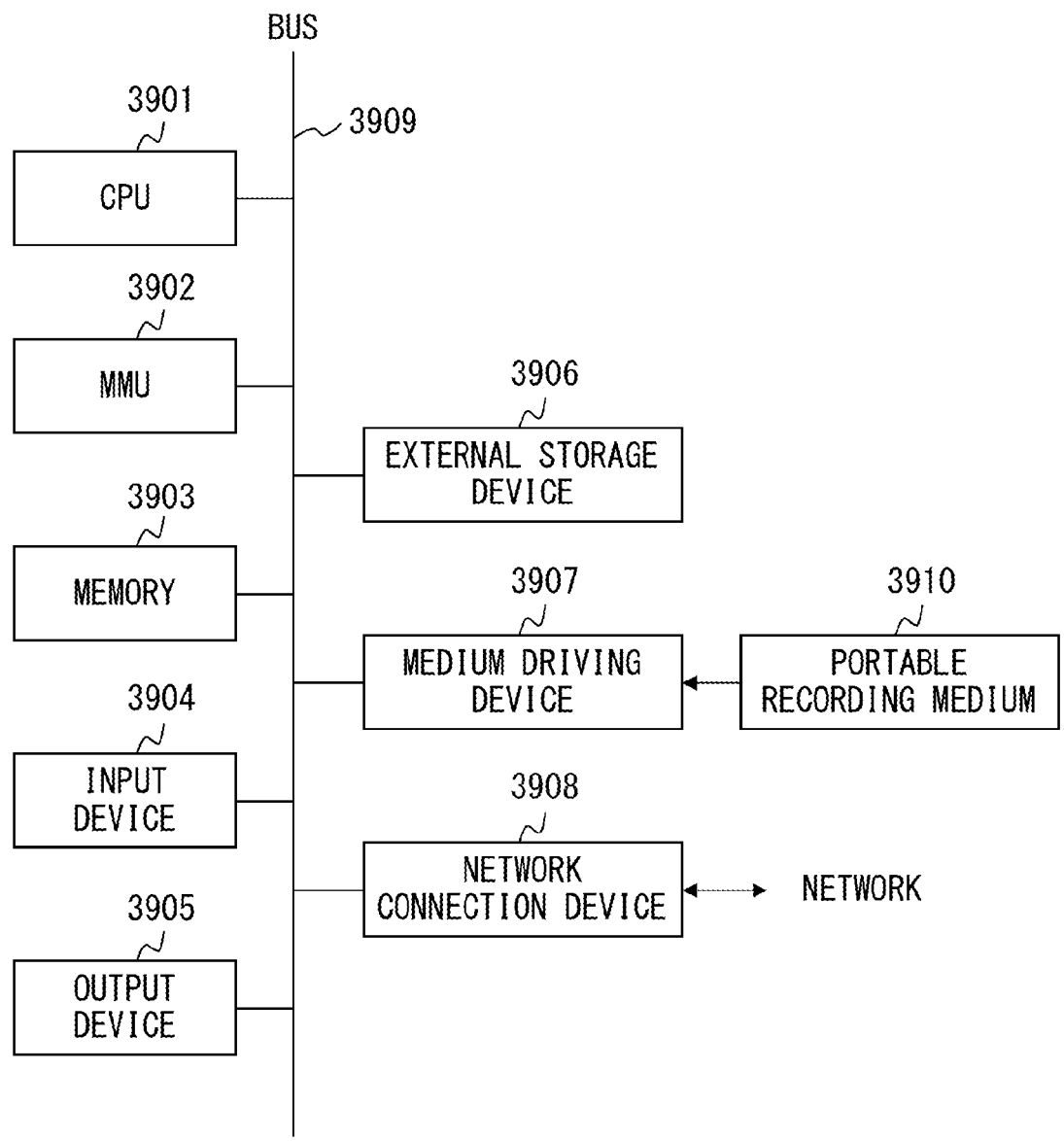
FIG. 39 illustrates a hardware configuration of an eighth information processing apparatus.

As the information processing apparatus 101 illustrated in FIG. 1, the information processing apparatus 2801 illustrated in FIG. 28, and the information processing apparatus illustrated in FIG. 2, 10, 21, 29, or 38, for example, an information processing apparatus (computer) illustrated in FIG. 39 can be used.

The information processing apparatus illustrated in FIG. 39 includes a CPU 3901, an MMU 3902, a memory 3903, an input device 3904, an output device 3905, an external storage device 3906, a medium driving device 3907 and a network connection device 3908, which are interconnected by a bus 3909.

The memory 3903 is a semiconductor memory such as a ROM (Read Only Memory), a RAM (Random Access Memory), a flash memory, or the like, and stores a program and data, which are used for processes. The memory 3903 is also available as the storage unit 111 or the storage unit 2811.

The CPU 3901 (processor) executes the processes of the control units 112, 113, 2812, the target VM 201, the setting VM 3801, and the hypervisors 202, 1001, 2101, 2901, 3802 by executing a program with the use of the memory 3903. The MMU 3902 controls a memory access from the CPU 3901 to the memory 3903.

The input device 3904 is, for example, a keyboard, a pointing device, or the like, and used to input an instruction and information from a user or an operator. The output device 3905 is, for example, a display device, a printer, a speaker or the like, and used to output an inquiry or a process result to a user or an operator.

The external storage device 3906 is, for example, a magnetic disk device, an optical disk device, a magneto-optical disk device, a tape device, or the like. The external storage device 3906 includes a hard disk drive, and a semiconductor memory such as a flash memory. The information processing apparatus may store a program and data in the external storage device 3906, and use the program and the data by loading them into the memory 3903.

The medium driving device 3907 drives a portable recording medium 3910, and accesses its recorded contents. The portable recording medium 3910 is a memory device, a flexible disk, an optical disk, a magneto-optical disk, or the like. The portable recording medium 3910 includes also a CD-ROM (Compact Disk-Read Only Memory), a DVD (Digital Versatile Disk), a USB (Universal Serial Bus) memory, and the like. A user or an operator may store a program and data onto the portable recording medium 3910, and use the program and the data by loading them into the memory 3903.

As described above, a computer-readable recording medium storing a program and data, which are used for various types of processes, includes a physical (non-transitory) recording medium such as the memory 3903, the external storage device 3906, and the portable recording medium 3910.

The network connection device 3908 is a communication interface that is connected to a communication network such as a Local Area Network (LAN), the Internet, or the like, and performs a data conversion that accompanies a wireless communication or a wired communication. The information processing apparatus may receive a program and data from an external device via the network connection device 3908, and use the program and the data by loading them into the memory 3903.

The information processing apparatus does not need to include all the components illustrated in FIG. 39. Some of the components can be omitted according to an application purpose or a condition. Moreover, if the information processing apparatus is a portable terminal such as a smartphone or the like, devices for a communication, such as a microphone and a speaker, are included as components. The information processing apparatus may include an image capturing device such as a camera as a component.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

The invention claimed is:

1. An information processing apparatus, comprising:
a memory configured to store memory restriction information for restricting an access to a memory area used by a first program from a second program, and access prohibition information for causing a fault to occur when the second program makes an access to the memory; and
a processor configured to determine whether the first program is under execution when the second program is executed, to change a setting of a memory management unit based on the access prohibition information so that the fault occurs when the second program makes an access to the memory while the first program is under execution, to determine whether an access from the second program to the memory area corresponding to an access destination which has caused the fault is permitted based on the memory restriction information when the fault occurs while the first program and the second program are under execution, to change the setting of the memory management unit so that the fault does not occur by the access from the second program to the memory area when the access to the memory area is permitted, and to resume execution of the first program and the second program in a state prior to an occurrence of the fault.

2. The information processing apparatus according to claim 1, wherein
the access prohibition information is information for prohibiting the access from the second program for each domain number included in a page table for converting a virtual address into a physical address of the memory, and
the processor changes a domain setting of the memory management unit based on the access prohibition information.

3. The information processing apparatus according to claim 1, wherein
the access prohibition information is information for replacing a page table for converting a virtual address for the second program into a physical address of the memory with a replacement page table where an entry is empty, and
the processor sets the replacement page table in the memory management unit based on the access prohibition information.

4. The information processing apparatus according to claim 1, wherein
the processor generates the memory restriction information while the first program is under execution, and stores the memory restriction information in the memory.

5. The information processing apparatus according to claim 4, wherein
the processor updates the memory restriction information when a page table for converting a virtual address for the first program into a physical address of the memory is changed.

6. The information processing apparatus according to claim 1, wherein
the processor sets the memory restriction information or the access prohibition information in the memory.

7. An information processing apparatus, comprising:
a memory configured to store table information for replacing a conversion table for converting a virtual physical address in a virtual machine into a physical address of the memory with a replacement conversion table for restricting an access to a memory area used by a first program from a second program, the first program and the second program running in the virtual machine; and
a processor configured to determine whether the first program is under execution when the second program is executed, and to set the replacement translation table in a memory management unit based on the table information when the first program is under execution, an entry for converting a virtual physical address in the virtual machine into a physical address of the memory area being empty in the replacement translation table.

8. The information processing apparatus according to claim 7, wherein
the processor sets the table information in the memory.

9. A computer-readable recording medium having stored therein a program for causing a computer to execute a process comprising:
determining whether a first program is under execution when a second program is executed, and changing a setting of a memory management unit based on access prohibition information stored in a memory so that a fault occurs when the second program makes an access to the memory when the first program is under execution; and
determining whether an access from the second program to a memory area used by the first program is permitted based on memory restriction information stored in the memory when the fault occurs while the first program and the second program are under execution, the memory area corresponding to an access destination which has caused the fault, changing the setting of the memory management unit so that the fault does not occur when the access to the memory area is permitted;
resuming execution of the first program and the second program in a state prior to an occurrence of the fault.

10. A computer-readable recording medium having stored therein a program for causing a computer to execute a process comprising:
determining whether a first program is under execution when a second program is executed, the first program and the second program running in a virtual machine; and
setting a replacement conversion table in a memory management unit when the first program is under execution, based on table information, which is stored in a memory, for replacing a conversion table for converting a virtual physical address in the virtual machine into a physical address of the memory with the replacement translation table for restricting an access from the second program to a memory area used by the first program, an entry for converting a virtual physical address in the virtual machine into a physical address of the memory area being empty in the replacement translation table.

* * * * *